US010466127B2

(12) United States Patent
Sgourakes

(10) Patent No.: US 10,466,127 B2
(45) Date of Patent: Nov. 5, 2019

(54) DIFFERENTIAL PRESSURE TRANSMITTER WITH INTRINSIC VERIFICATION

(71) Applicant: AVGI Engineering, Inc., Millis, MA (US)

(72) Inventor: George E. Sgourakes, Millis, MA (US)

(73) Assignee: AVGI Engineering, Inc., Millis, MA (US)

( * ) Notice: Subject to any disclaimer, the term of this patent is extended or adjusted under 35 U.S.C. 154(b) by 0 days.

(21) Appl. No.: 16/152,969

(22) Filed: Oct. 5, 2018

(65) Prior Publication Data

US 2019/0120713 A1    Apr. 25, 2019

Related U.S. Application Data

(63) Continuation-in-part of application No. 15/727,449, filed on Oct. 6, 2017, now abandoned, which is a
(Continued)

(51) Int. Cl.
*G01L 19/06* (2006.01)
*G01L 19/02* (2006.01)
(Continued)

(52) U.S. Cl.
CPC .............. *G01L 19/06* (2013.01); *F16K 11/00* (2013.01); *G01L 9/0072* (2013.01);
(Continued)

(58) Field of Classification Search
CPC ..... G01L 19/06; G01L 19/04; G01L 19/0084; G01L 10/0046; G01L 9/0072;
(Continued)

(56) References Cited

U.S. PATENT DOCUMENTS 2,925,095 A   2/1960  Bates
3,747,042 A   7/1973  Sheldon
(Continued)

FOREIGN PATENT DOCUMENTS

EP    0211519 A2    2/1987
GB    1412631 A     11/1975

OTHER PUBLICATIONS

International Search Report for corresponding PCT Application PCT/US2011/059114, dated May 10, 2012; date of completion of report May 10, 2012.
(Continued)

*Primary Examiner* — Nathaniel T Woodward
(74) *Attorney, Agent, or Firm* — Nelson Mullins Riley & Scarborough LLP; Thomas J. Engellenner; Reza Mollaaghababa

(57) ABSTRACT

Methods of compensating for undesired influences in a pressure transmitter wherein the pressure transmitter comprises a body for housing a low-pressure sensor and a high-pressure sensor each of which is in fluid communication with a port and in further fluid communication with each other through a connector tube containing a fill fluid. Various embodiments of the compensation process use one of the high-pressure and the low-pressure sensor as a common reference, compensating for changes in calibration, such as changes in the effective areas or spring rates of the non-reference sensor.

18 Claims, 13 Drawing Sheets

Related U.S. Application Data continuation of application No. 14/957,191, filed on Dec. 2, 2015, now Pat. No. 9,784,633, which is a continuation-in-part of application No. 13/883,043, filed as application No. PCT/US2011/059114 on Nov. 3, 2011, now Pat. No. 9,207,140.

(60) Provisional application No. 61/409,631, filed on Nov. 3, 2010.

(51) Int. Cl.
*G01L 13/02* (2006.01)
*G01L 19/00* (2006.01)
*F16K 11/00* (2006.01)
*G01L 9/00* (2006.01)
*G01L 19/04* (2006.01)
*G01L 19/14* (2006.01)

(52) U.S. Cl.
CPC ........ *G01L 13/025* (2013.01); *G01L 19/0015* (2013.01); *G01L 19/0046* (2013.01); *G01L 19/0084* (2013.01); *G01L 19/02* (2013.01); *G01L 19/04* (2013.01); *G01L 19/142* (2013.01); *G01L 19/14* (2013.01)

(58) Field of Classification Search
CPC . G01L 19/142; G01L 19/0015; G01L 13/025; G01L 19/02; G01L 19/14; F16K 11/00
See application file for complete search history.

(56) References Cited

U.S. PATENT DOCUMENTS

| | | | |
|---|---|---|---|
| 4,051,729 A | 10/1977 | Thordarsson | |
| 4,193,420 A | 3/1980 | Hewson | |
| 4,393,714 A | 7/1983 | Schmidt | |
| 4,466,290 A | 8/1984 | Frick | |
| 4,479,070 A | 10/1984 | Frische et al. | |
| 4,501,051 A | 2/1985 | Bell et al. | |
| 4,502,335 A | 3/1985 | Wamstad et al. | |
| 4,572,000 A | 2/1986 | Kooiman | |
| 4,841,776 A | 6/1989 | Kawachi et al. | |
| 4,865,360 A | 9/1989 | Adams | |
| 4,909,063 A | 3/1990 | Olsen | |
| 4,926,674 A * | 5/1990 | Fossum | G01L 19/02 73/1.62 |
| 5,526,692 A | 6/1996 | Keiser | |
| 6,000,427 A | 12/1999 | Hutton | |
| 6,029,527 A * | 2/2000 | Seitz | G01F 1/363 73/861.52 |
| 6,321,585 B2 | 11/2001 | Sgourakes | |
| 6,725,725 B1 | 4/2004 | Werner et al. | |
| 7,477,996 B2 * | 1/2009 | Dozoretz | G01L 13/00 702/45 |
| 2001/0027677 A1 | 10/2001 | Sgourakes | |
| 2001/0032515 A1 | 10/2001 | Willcox et al. | |
| 2002/0023502 A1 | 2/2002 | Petrich et al. | |
| 2006/0247539 A1 | 11/2006 | Schugt et al. | |
| 2007/0234814 A1 | 10/2007 | Silverbrook | |
| 2008/0110272 A1 | 5/2008 | Douglas | |
| 2010/0011869 A1* | 1/2010 | Klosinski | G01F 1/363 73/700 |
| 2010/0218612 A1 | 9/2010 | Ohtani et al. | |

OTHER PUBLICATIONS

Canadian Office Action for corresponding Canadian Patent Application No. 2,816,876 dated Jun. 19, 2017.

European Search Report for corresponding EP Application No. 11838799.2 dated May 2, 2016.

* cited by examiner

DIFFERENTIAL PRESSURE TRANSMITTER WITH INTRINSIC VERIFICATION

CROSS-REFERENCE TO RELATED APPLICATIONS

The present application claims priority as a continuation-in-part application to U.S. patent application Ser. No. 15/727,449, filed on Oct. 6, 2017, which in turn claims priority as a continuation application to U.S. patent application Ser. No. 14/957,191, filed on Dec. 2, 2015, now U.S. Pat. No. 9,784,633, issued Oct. 10, 2017, which is a continuation-in-part of Ser. No. 13/883,043, filed on Dec. 10, 2013, now U.S. Pat. No. 9,207,140, issued Dec. 8, 2015, which is in turn a 371 of International application PCT/US2011/059114, filed Nov. 3, 2011, which claims priority to U.S. Provisional Patent Application No. 61/409,631, filed Nov. 3, 2010. Each of the above applications to which the present application claims priority is herein incorporated by reference in its entirety.

FIELD OF THE INVENTION

The invention relates to improved differential pressure transmitters with improved accuracy, process containment, innovative remote calibration, their methods of use and manufacture preferably for industrial uses.

BACKGROUND OF THE INVENTION

Differential pressure transmitters have a significant error envelope for service within their operating limits, require a great deal of care and maintenance to satisfy their intended purposes. It is common practice for differential pressure transmitters to be removed from the application or field installation and transported to well-equipped calibration laboratories to assure the accuracy of their measurement. This practice has limitations, is costly and disruptive. Furthermore, calibration laboratories rarely simultaneously duplicate the combined actual process conditions of a specific transmitter to determine performance under actual operating conditions. Having no accepted means of conducting simultaneous combined influences, they test one influence at a time and add the results. Calibrations are violated during inadvertent over-range when re-installing the transmitter on-line and unknowingly compromise "assurance" of accuracy provided by the calibration. The very precaution to assure highest performance unknowingly induces an error. Often, a compromised partial calibration is conducted, whereupon the output of the transmitter is adjusted for a zero value by a technician at the transmitter having equalized the pressure upon the transmitter. The industry is subjected to a significant error envelope in conducting asset management inducing unacceptable financial unknowns.

Unfortunately, measurement accuracy is influenced by the combination of many environmental process and environmental conditions such as process pressure, process temperature, environmental temperature, solar radiation, local neighboring thermal radiation, inadvertent over-range, electronic/mechanical drift and enclosure distortion due to process pressure or bolting stresses. All these influences are only evaluated under steady state conditions, even though these influences are interdependent. The user or field technician is not routinely provided with standard techniques or methods to properly compensate for these interdependencies, and usually does not have the required facilities. Without means for managing the interdependencies, they are usually considered as being independent and result in a challenge to calibrate while any condition is not at a steady state condition.

The present practice is to compensate for these influences without considering their interdependencies. This is pragmatically achieved by erroneously applying independent corrections for the prominent influences. This neglect of the interdependency of the various influences increases measurement errors. Accurate compensation requires considering the actual combined environmental and process conditions that might be at transient or steady state.

Conventional differential pressure transmitters having a single sensor exacerbate these detrimental influences. For example, most of the existing single sensor, dual fill fluid volume differential pressure transmitters tend to have differences in the fill fluid volumes, operate with differences in temperature of these fill fluid volumes, differences in the spring rates and effective areas of the pressure sensitive elements of the high and low sides. These differences limit their capabilities for they produce erroneous differential pressures due to process pressure, process temperature or enclosure distortion acting upon these differences. Similarly, within single sensor, single fill fluid volume differential pressure transmitters having a significant difference in the spring rate of pressure sensitive elements of the high and low side isolation diaphragms will also produce a detrimental differential pressure due to process pressure, transmitter temperature or enclosure distortion acting upon these differences.

These conditions impact asset management, the environment and product quality. A user, until now, has had no recourse other than to accept these poor conditions.

SUMMARY OF THE INVENTION

The many environmental and process influences referred to earlier, are exacerbated by current differential pressure transmitters employing a single differential pressure sensor with dual isolation diaphragms. A single sensor differential pressure transmitter cannot compensate for process or environmental influences without determining the actual process pressure and temperature to determine the compensation factors and are typically limited to steady state conditions. A novel differential pressure transmitter is proposed that inherently eliminates these environmental influences and the compensation for these environmental influences does not require an awareness of the process pressure or a need for a process pressure sensor nor a temperature measurement.

Specifically, the object of the present invention is to provide a dual sensor differential pressure transmitter with a single fill fluid volume that inherently eliminates process and environmental performance influences while operating in steady state or transient environment, minimizes zero/span over-range, provides increased signal level, improved process containment and a substantial reduction in product costs.

In a first embodiment, the proposed differential pressure transmitter can provide the desired improved performance, process containment at low product cost. In a second embodiment, the invention provides enhancements satisfying more demanding applications. In a third embodiment, the invention provides capabilities presently unavailable in the industry and satisfies the most demanding applications. This novel system provides remote calibration, traceable to NIST, at actual combined operating conditions and without interrupting signal output.

Thus, the proposed differential pressure transmitter intrinsically eliminates detrimental process and environmental influences and provides an optional remotely activated assurance of the elimination of these environmental influences traceable to NIST within +/−0.005% of reading without the need for a technician in the field, while at combined simultaneous operating conditions and without interruption of signal output.

The proposed dual sensor, single fill fluid volume differential pressure transmitter, compensation does not require monitoring of the process pressure and temperature. The object of the present invention is to provide a differential pressure transmitter that intrinsically eliminates process and environmental performance influences, increases signal level while substantially reducing product costs and provides a means for conducting calibration audits at actual operating conditions, remotely without a technician in the field.

In a first embodiment, the differential pressure transmitter comprises a body, and first and second cavities within said body connecting to a first and a second port, respectively on the exterior of said body. The transmitter further comprises first and second flexible element assemblies within and sealed to said first and second cavities in a planar housing minimizing influence of vibration that would exist if aligned in an axial manner, thereby forming a third and a fourth cavity and a fifth cavity connecting said third and said fourth cavities. The transmitter further comprises a fill fluid having a fluid fill volume within and connecting said third, said fourth and said fifth cavities and means of sensing the first and second position of a first and a second flexible element end within said third and said fourth cavities. The transmitter further comprises means of providing a conditioned response from the said first and said second position of a first and a second flexible element end, wherein, the said conditioned response of said first and said second flexible element end position is proportional to the desired measurement of the said differential pressure applied to said differential pressure transmitter.

In a second further embodiment the differential pressure transmitter of the invention, said aforementioned means of sensing the position of said first and said second flexible element end is achieved by sensing the capacitance between the said first and said second flexible element end and a first and second electrode. In one aspect said first and said second electrode is located within and is electrically insulated and attached to said third and said fourth cavity. In one aspect, a first and a second electrical conductor is electrically attached to said first and said second electrode and said first and said second electrical conductor is sealed to contain said fill fluid within said third and said fourth cavities and electrically insulated from said body. An electronic module external to said body and electrically connected to said first and said second conductor and said body can also be provided. The electronic module senses the capacitance between said first and said second flexible element end and said first and said second electrode and provides a conditioned response indicative of the said differential pressure. The change in position of said first and said second flexible element end produces a said first and said second change in capacitance between said first and said second flexible element end and said first and said second electrode and said first and said second change in capacitance is conditioned to provide a response that is proportional to the desired measurement of said differential pressure having minimal undesireable influences from the process variables.

In a third, further embodiment, a change in said fill fluid volume due to temperature variation, process pressure, enclosure or bolting distortion produces equal and opposing influences upon said first and said second flexible element assemblies which are produced or compensated to appear to have equal ratios of spring rate to effective areas, thereby causing said temperature variation and said process pressure variation and said enclosure distortion or bolt variation to have minimal influence upon differential pressure measurement.

The dual sensor single fill volume has many benefits not found in present transmitters, such as:

a. The single fill volume responds to undesireable influences such as the process temperature, process pressure and their variation by inherently applying induced change in the pressure developed by said influences and their variation equally to each sensor. The said pressure being applied equally to both sensors assures no differential pressure due to said influences being applied upon the sensors.

b. The dual sensors capture the desired differential pressure by sensing the differential pressure upon one of the sensors experiencing an increasing capacitance signal due to a decreasing sensing gap when input pressure to be sensed is increasing, and upon the remaining sensor having a decreasing capacitance signal due to an increasing sensing gap when input pressure is increasing. Thus, the output of the dual sensors is composed of the difference of the output of the dual sensors which are of opposite sign. This is a significant benefit, for it rejects common mode influences while doubling the output of the signal providing improved resolution.

c. Obtaining the desired output by acquiring the difference of the two sensors provides a means of rejecting any common mode undesireable influences if the gain of each of the dual sensors is assured to be identical by innovative compensation. The gain of the two sensors may be assured to be identical by many approaches. For example, first, the signal of each of the dual sensors may be sequentially captured, and their average value then calculated. Second, this average value is subtracted from each of the captured values, causing these signals to appear to be equally displaced from a zero-point reference position. Although of opposing sign, equal gain is assured. Third, if the common mode undesireable influences are not precisely compensated, a zero-point residual will develop upon subtracting. This condition is eliminated by subtracting any such zero-point value from all values, thereby eliminating any zero-value residuals while retaining equal gain having opposing sign of the dual sensors.

d. The undesirable over range influence upon zero-point and span has been significantly improved within the limits of operation of temperature and process pressure. This has been achieved by improved support maintaining the elastic properties of the flexible elements during the over range.

The invention further contemplates an electronic module. In one embodiment, the electronic module comprises means for sensing said first capacitance between said first flexible element end and said first electrode and a said second capacitance between said second flexible element end and said second electrode; means for determining the first and second position of said first and said second flexible element end by sensing said first and said second capacitance; means for determining a reference zero point condition position of said first and said second flexible element end while at reference temperature and reference common pressure and no applied said differential pressure; means for determining operating zero point condition position of said first and said second flexible element end while at operating temperature and operating common pressure and no applied said differential pressure; means for determining reference differential pressure condition position of said first and said second flexible element end while at reference temperature and reference common pressure and said differential pressure; means for determining operating differential pressure condition position of said first and said second flexible element end while at operating temperature, operating pressure and said differential pressure; a means for determining a first and a second difference in operating position between said operating differential pressure condition position and said operating zero condition position of said first and said second flexible element end; a means for providing an output proportional to said first and a second difference in operating position between said operating differential pressure condition position and said operating zero condition position of said first and said second flexible element end; a means for determining a first and a second difference in reference position between said reference differential pressure condition position and said reference zero point condition position of said first and said second flexible element end; and a means for providing an output proportional to the said first and a second difference in reference position between said reference differential pressure position and said reference zero point position of said first and said second flexible element end.

In another embodiment, the electronic module of the invention comprises means for determining said fill fluid temperature; means for determining said fill fluid pressure without a dedicated pressure sensor; means for calculating the change in said operating differential pressure condition from reference zero condition due to a change in said fill fluid temperature; means for calculating the change in said operating differential pressure condition from said reference zero point condition due to a change in said fill fluid pressure; means for providing an output of said temperature; means for providing an output of said pressure; and means for providing an output of said reference zero point condition thereby determining a reference zero point condition.

The differential pressure transmitter of the invention may optionally further comprise a three-position valve. In one embodiment the three-position valve comprises: a valve body having a first external port and a second external port to external pressures and said body having two internal transmitter ports a first internal port and a second internal port connecting to said differential pressure transmitter; a rotary valve plug having two internal flow conduits; and means of positioning said rotary valve plug to any of three-positions. In one aspect, the three positions of the valve are as follows: a first position wherein the first external port is connected to the first internal port and the second external port is connected to the second internal port; a second position wherein the first internal port is connected to the second internal port and no connection made between the first and second external ports; and a third position wherein the first external port is connected to the second internal port and the second external port is connected to the first internal port. In this aspect, normal operation of said differential pressure transmitter is configured per said first position, process isolation and said differential pressure transmitter equalization is configured per said second position and reverse operation of said differential pressure transmitter is configured per said third and wherein prior to entering said first or third positions said three-position valve enters said second position In another aspect, the aforementioned three position valve may further comprise means of determining said reference zero position by isolation of said differential pressure transmitter from said process while maintaining process pressure upon said differential pressure transmitter and equalization of the said differential pressure upon said differential pressure transmitter in said second position of said three position valve and whereby, without any said differential pressure or constant said differential pressure, the said differential pressure transmitter output in said normal operation is compared to the said differential pressure transmitter output in said reverse operation and provides an indication of the differences in density and/or liquid height of process fluid in the impulse lines connected to said differential pressure transmitter and thereby provides a means for the compensation of impulse line density and level influences.

In one aspect the above-mentioned electronic module implements a method for compensating the combined influence of said temperature and said pressure due to said change in said fill fluid fill volume, said spring rates and said effective areas of said first and said second flexible element assemblies. In one embodiment the method comprises isolating said differential pressure transmitter from said process while maintaining said process pressure and said temperature within said differential pressure transmitter and allowing equalization of said high side and said low side; sensing said process pressure with a process pressure sensor; sensing said temperature with a process temperature sensor; sensing said operating zero condition of said first and said second flexible element at said process pressure and said temperature; calculating the deflection of said first and second flexible element due to said process pressure; calculating the deflection of said first and second flexible elements due to said process temperature; calculating the ratio of said spring rate to said effective area of said first and second flexible elements; calculating the said spring rates of said first and second flexible elements; calculating the said areas of said first and second said flexible elements; and generating and applying compensation factors for said first and said second flexible elements for said process pressure and said temperature. The aforementioned-method provides compensation for the said differential pressure transmitter for influences of the combined influence of said temperature and said pressure due to said change in said fill fluid fill volume, said effective areas and said spring rates of said first and said second flexible element assemblies.

In another embodiment the differential pressure transmitter of the invention may optionally comprise a three-position actuator. In one embodiment, the three-position actuator comprises a first cylinder having a first piston and a first pressure port, the first cylinder having a stop for limiting axial motion of said first piston; and a second cylinder having a second piston, said second cylinder having an axial slot and said second piston having a radial extension positioned within said axial slot of said second cylinder; and a third cylinder having a third piston and a second pressure port the third cylinder further comprising a stop for limiting axial motion of said third piston. A first actuator position is obtained by pressure being applied to said first cylinder through said first port, a second actuator position is obtained by pressure being applied to said third cylinder through said second port and a third position is obtained by pressure applied to said first cylinder through said first port and to third cylinder though said second port. Positioning of said center piston moves said three-position valve to said position one, said position two or said position three and said radial extension of said second piston provides a means of moving an external device to any of the said three positions.

In another embodiment, the transmitter may optionally include a gravitational pressure reference source. In one aspect, the gravitational pressure reference source comprises: a body; an internal cavity having a post; a sphere having a hole containing termination of said post that is attached to said sphere is sealed to said post; a cylinder having enlarged internal diameters at each end; a stepped cylindrical post attached to said cylinder; a cylindrical weight with an internal diameter accepting said stepped cylindrical post; and a means of securing said stepped cylindrical post to said cylindrical weight, wherein said cylinder, said stepped cylindrical post and said cylindrical weight comprise a gravitational reference assembly. The gravitational pressure reference source further comprises an internal cylindrical magnet within a cavity in said body and vertically below and concentric with said gravitational reference assembly wherein the said internal cylindrical magnet can be raised by an external magnet field with opposing magnetic poling and said raising of said internal magnet raises said gravitational reference assembly relative to said sphere and wherein upon a change of said external magnet field the said internal cylindrical magnet falls rapidly due to gravity and the said change in said external magnet field and wherein the gravitational reference assembly falls under the action of gravity producing a reference pressure in the said cavity of the said cylinder and wherein said reference pressure is applied to the internal cavity of the post. The gravitational pressure reference source may also include a means of measuring temperature by capturing the time of the descent for a known distance of the said gravitational reference assembly and a means for converting the said time of a descent for a said known distance to an average velocity of the said fill fluid through said gravitational reference assembly and from said average velocity through said gravitational reference assembly determine a viscosity of said fill fluid and from said viscosity determine said temperature from known viscosity versus temperature relationships. The response of the differential pressure transmitter upon the application of the gravity pressure reference provides a means of sensing said reference pressure for verifying calibration and determining said temperature of said fill fluid.

The differential pressure transmitter may also further comprise an actuator for actuating said gravitational pressure reference. In one embodiment the gravitational pressure reference actuator comprises: (a) a piston having a longitudinal axis, said piston having four cavities with an axis of symmetry perpendicular to and intersecting said longitudinal axis of said piston and said axis of symmetry of said four cavities and said longitudinal axis are parallel and said piston having four magnets contained within the said cavities and the magnetic poling of each said magnet alternates along said piston longitudinal axis; and (b) a cylinder with a first and a second closed end wherein said piston and said magnets are contained within said cylinder and said piston and said cylinder having means for preventing rotation of said piston within said cylinder. The cylinder has a first and a second pneumatic port located at a first and second closed end of said cylinder respectively. By applying pneumatic pressure to the first pneumatic port the piston is moved to the second closed end. Likewise, by applying pneumatic pressure to the second pneumatic port the piston is moved to the first closed end of the cylinder.

In one aspect, the magnets of the aforementioned gravitational pressure reference actuator, within said process enclosure are raised by external magnets by providing an axial opposing magnetic field. Likewise, said magnets within a said process enclosure are lowered by said external magnets by providing an axial additive magnetic field and means provided for actuating said gravitational pressure reference.

In one aspect of the invention, the invention calculates a correction factor to eliminate undesireable influences as follows. An external, equal and common pressure is applied to the said first and second flexible element assemblies. The deflection of each of said flexible element assemblies, because of said compression of said fill fluid due to said pressure, is sensed. The difference in the ratio of spring rate to effective area of a said first and second flexible element assemblies is determined by comparing the said displacements of the said pair of flexible element ends in response to the said common pressure. A correction factor consisting of the ratio of spring rate to effective areas of said first and second flexible element assemblies is produced and is used to compensate for said deflections of said first and second flexible element assemblies in the sensing of said differential pressures.

In addition to process and environmental influences, over-range of the differential pressure transmitter is a major influence and presently usually not specified or considered. If specified, it usually does not apply to worst-case conditions resulting from a combination of maximum working pressure while at maximum process temperature. The proposed differential pressure-sensing concept minimizes these over-range concerns due to hysteresis from over stressing by an assurance that the proposed concept is not highly stressed and well supported during the over-range. Zero and span return errors from overstressing as in present practice are significantly minimized. Thus, an improvement in over-range performance is inherent in the proposed differential pressure-sensing concept and resolves the worst-case condition of maximum process pressure over-range at maximum process temperature.

The proposed dual sensor, single fill fluid volume differential pressure transmitter is shown in FIG. 1 and the dual sensor concept is shown in cross-section in FIG. 2. This proposed dual sensor concept does not eliminate the undesirable change in fill fluid volume occurring with changes in process pressure, temperature or enclosure distortion but it does inherently compensate to eliminate the undesirable error influence. Any differential pressure developed due to the change in fill fluid volume for whatever cause is applied equally and opposingly to the high and the low side flexible element assemblies with no differential pressure being sensed by the differential pressure transmitter. Ideally, if the combined response of spring rates and effective areas of the high and low side flexible element assemblies are matched, there cannot be a differential pressure developed in the proposed concept due to the detrimental influences.

Optimization of the proposed concept requires design and manufacturing considerations to assure this match of the combined response of spring rates and effective areas of the high and low side flexible element assemblies of (3 A) and (3B) of FIG. 2. Although these efforts may produce a good match, it cannot be assured to be insignificant. However, an innovative simple manufacturing procedure assures these differences in the spring rates and effective areas of the high and low side flexible element assemblies due to manufacturing tolerances are insignificant. During the manufacturing process, a high pressure is simultaneously applied to the high and low side flexible element assemblies while monitoring the deflections of the high and low side flexible element ends resulting from the compression of the fill fluid. The difference in the deflection of the flexible element ends provides a means of compensating for the difference in the effective areas and spring rates of the flexible element assemblies. The compensation process equation will be developed further in the discussion to illustrate how the compensation is implemented. Thus, the difference in the spring rates and effective areas of the flexible element assemblies due to manufacturing tolerances is minimized and ideally eliminated assuring a high level of performance. Furthermore, this process can also be applied in the field. Thus, a user can verify high performance upon receipt and during routine maintenance.

The difference in the spring rates and effective areas of the flexible element assemblies due to manufacturing tolerances is minimized and ideally eliminated assuring a high level of performance by a very simple approach during actual operation by considering one sensor as a reference and applying a compensation factor to the remaining sensor achieving an ideal match. This compensation is best described shortly after an awareness of important details of operation are presented.

The proposed dual sensor, single fill fluid volume differential pressure transmitter is simple in construction. A single fill fluid volume exists between the high side flexible element assembly and low side flexible element assembly. Within this single volume, there are fixed electrodes (4a) and (4b) of FIG. 2 that are in close proximity to each of the flexible element ends (8A) and (8B). The sensing is achieved by simultaneously measuring the differential change in capacitance due to the deflection of the flexible element end with respect to the fixed electrode for the high and the low side. A pressure applied to the high side deflects the flexible element end of the high side inwardly towards the fixed electrode and simultaneously the fill fluid causes the low side flexible element end to deflect outwardly away from the fixed electrode due to the equal displaced volume of the flexible element assemblies.

Operation of the differential pressure transmitter in a flow or level application, is categorized by four conditions that may be defined:

1. When the transmitter is assured to be at a reference temperature, reference process pressure and no differential pressure, the output is defined as "reference zero condition".

2. When the transmitter is assured to be at a known temperature, known process pressure and no differential the output is defined as "operating zero condition".

3. When the transmitter is assured to be at a known temperature, known process pressure and a known differential pressure with respect to "reference zero condition" is defined as "reference differential pressure condition".

4. When the transmitter is assured to be at a known temperature, known process pressure and at a differential pressure being measured, it is defined as "operating differential pressure condition".

The proposed advanced and premium differential pressure transmitter concepts will satisfy the requirements of more demanding applications. The advanced and premium differential pressure transmitters are composed of the standard differential pressure transmitter with ancillary devices.

There are three ancillary devices. The advanced and premium product has an actuator that remotely operates a three-position valve for normal, equilibrate or reverse position. The equilibrate-position isolates the transmitter from the process.

The premium product also incorporates a gravitational pressure reference that verifies calibration traceable to National Institute of Standards with an actuation device that provides remote operation of the gravitational pressure reference without a technician at the site.

The proposed premium dual sensor, single fill fluid volume differential pressure transmitter concept provides capabilities that presently are not available in the industry and will now be described.

Differential pressure transmitters have been improved in recent years. An example is provided in U.S. Pat. No. 6,321,585 Sgourakes for a Differential Pressure Generator. This improvement eliminates all detrimental combined interdependent process and environmental influences of differential pressure transmitters by remotely verifying measurement accuracy within +/−0.005% of reading traceable to National Institute of Standards while transmitter is on-line at process and environmental operating conditions for flow and liquid level applications.

The present invention integrates U.S. Pat. No. 6,321,585 Sgourakes Differential Pressure Generator within the proposed premium differential pressure transmitter and with the addition of proposed ancillary devices, provides an exceptional high-performance premium differential pressure transmitter for flow and liquid level applications with remote calibration assurance that is not in any existing product.

The premium differential pressure transmitter provides significant advancements in performance. Some of the advancements enhancing the remote calibration verification of U.S. Pat. No. 6,321,585 Sgourakes for a Differential Pressure Generator are:

1. A reference zero condition value is available with each differential pressure observation providing an ability to monitor zero-point value during each differential pressure measurement.

2. Detrimental influences of environmental temperature, process temperature and process pressure are inherently eliminated from the differential pressure transmitter.

3. Automatically scheduled sensor calibrations can be achieved remotely during routine sustained operation.

4. Reverse flow capability. The three-position valve provides an ability to measure normal or reverse flows.

5. Elimination of density or level differences in impulse lines is assured. This is achieved by comparing the zero condition in normal and reverse positions of the three-position valve. Any difference can be attributed to density or level differences in the impulse lines and the influence compensated.

6. The transmitter provides greater range limits by providing lower span capability achieved by a significant reduction of the error envelope, avoiding the cost and complexity of multiple transmitters with intermediate spans.

7. Minimal over-range influence of zero and span.

8. A very low cost of manufacture achieved based upon manufacturing major components from bar stock that is automatically machined without need for presence of a machinist.

9. Calibration is assured to be within +/−0.005% of reading traceable to National Standards Institute, achieved from remote locations with an unattended computer, scheduled as desired, without a technician present at transmitter, at actual combined operating conditions, on-line and without signal interrupt for flow or level applications.

10. Pro-active maintenance can warn if a trend of concern develops in sequential calibration assurances or from monitoring of the zero value at each differential pressure acquisition.

11. Instantaneous assurance of proper operation can be remotely verified within minutes during crisis conditions without signal interruption.

12. Eliminates the need for travel to the site, flights, accommodations, rental vehicle, well equipped lab or an interruption of signal. The transmitter continues operation in process line, eliminates hand written manual calibration history management, eliminates lengthy evaluations in a calibration laboratory requiring the simulation of process pressures and environmental temperatures.

13. Provides a capability for remotely achieved customer/buyer audits eliminating skilled operators, costly travel, hotel accommodations and seasoned resources.

14. The present capacitive single sensor concepts are typically a stretched diaphragm with an effective area of approximately ⅓ inch squared with non-linear deflection. Conversely, the proposed capacitive concept has an effective area of 3.5 inches squared with linear deflection. Thus, providing a factor of ten improved sensitivity.

According to one aspect, there is disclosed a method of compensating for undesired influences in a pressure transmitter wherein the pressure transmitter comprises a body for housing a high-pressure sensor and a low-pressure sensor each of which is in fluid communication with a port and in further fluid communication with each other through a connector tube containing a fill fluid. The method may comprise acquiring a first deflection signal from the high-pressure sensor in response to an applied pressure then instantly acquiring a second deflection signal from the low-pressure sensor in response to the applied pressure, computing an average value of said first and second deflection signals, subtracting said average value from said first and said second deflection signals so as to generate normalized first deflection signal and normalized second deflection signal, respectively, subtracting a high-pressure zero point offset from said normalized first deflection signal to generate offset-corrected normalized first deflection signal, subtracting a low-pressure zero point offset from said normalized second deflection signal to generate offset-corrected normalized second deflection signal, multiplying said offset-corrected normalized first deflection signal by a first compensation scaling factor to obtain scaled offset-corrected normalized first deflection signal, multiplying said offset-corrected normalized second deflection signal by a second compensation scaling factor to obtain scaled offset-corrected normalized second deflection signal, and subtracting said first scaled offset-corrected normalized first deflection signal from said second scaled offset-corrected normalized second deflection signal to derive a compensated differential pressure.

In some embodiments, the method of compensating may further comprise multiplying said compensated differential pressure by a conversion factor to obtain said compensated differential pressure in desired units of measure.

In some embodiments, any of said high-pressure and low-pressure zero offsets may be determined via regression analysis of previously obtained signals from said high pressure sensor and said low-pressure sensor, respectively, in response to applied pressures. In other embodiments, said high-pressure and low-pressure zero offset may be determined from an initial calibration.

In some embodiments, said first compensation scaling factor may be proportional to a predefined standard deflection associated with said high-pressure sensor and may be inversely proportional to a full span deflection associated with said high pressure sensor obtained via regression analysis of previously obtained signals from said high-pressure sensor.

In some embodiments, said second compensation scaling factor may be proportional to a predefined standard deflection associated with said low-pressure sensor and may be inversely proportional to a full span deflection associated with said low-pressure sensor obtained via regression analysis of previously obtained signals from said low-pressure sensor.

According to another embodiment, there is provided a method of compensating for undesired influences in a pressure transmitter wherein the pressure transmitter comprises a low-pressure sensor and a high-pressure sensor in further fluid communication with each other through a connector tube containing a fill fluid. The method comprises acquiring deflection signals from the high-pressure sensor and the low-pressure sensor, computing an average value of the deflection signals, generating normalized deflection signals based on the average value, generating offset-corrected normalized deflection signals, scaling said offset-corrected normalized deflection signals, and deriving a compensated differential pressure output based on the scaled offset-corrected normalized deflection signals.

In some embodiments, the method may further comprise converting said compensated differential pressure output to desired units of measure.

In some embodiments, generating said normalized deflection signals may comprise equalizing the gains of the high-pressure sensor and the low-pressure sensor.

In some embodiments, generating offset-corrected normalized deflection signals may further comprise determining zero offsets for the high-pressure sensor and the low-pressure sensor. In some embodiments, determining zero offsets may comprise performing regression analysis of previously obtained signals from the high-pressure sensor and the low-pressure sensor.

In some embodiments, scaling said offset-corrected normalized deflection signals comprises multiplying said offset-corrected normalized deflection signals for each of the high-pressure sensor and the low-pressure sensor by respective compensation scaling factors.

In some embodiments, the compensation scaling factor for the high-pressure sensor may be proportional to a predefined standard deflection associated with said high-pressure sensor and may be inversely proportional to a full span deflection associated with said high pressure sensor obtained via regression analysis of previously obtained signals from said high-pressure sensor. The compensation scaling factor for the low-pressure sensor may be proportional to a predefined standard deflection associated with said low-pressure sensor and may be inversely proportional to a full span deflection associated with said low-pressure sensor obtained via regression analysis of previously obtained signals from said low-pressure sensor.

In some embodiments, a method according to the present invention can further include sensing a compression of the fill fluid by any of said high-pressure or low-pressure zero offset to provide a measure of the process pressure after compensating for any influence of temperature on the fill fluid. In some such embodiments, a temperature sensor is employed to measure the temperature of the fill fluid.

In some embodiments, a method according to the present teachings can further include providing a differential pressure sustained by each of said dual sensors by employing a relation predicting the internal pressure upon said dual sensors.

In many embodiments, the steps of methods according to the present teachings are performed by a digital processor.

BRIEF DESCRIPTION OF THE DRAWINGS

FIG. 6A is a cross sectional view of the three position valve in the equilibrate position with center piston positioned in center position.

DETAILED DESCRIPTION OF THE INVENTION

Figure 1:
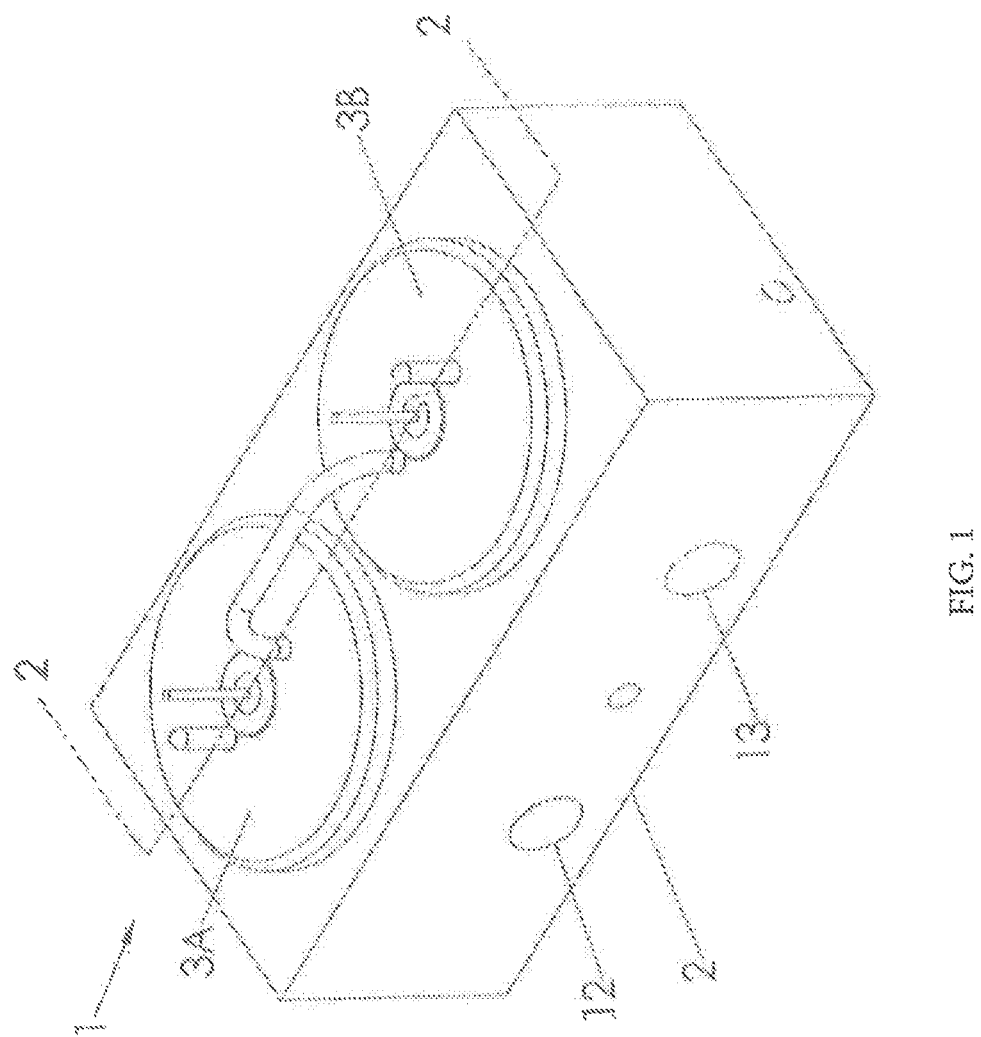
FIG. 1 is an isometric view of the differential pressure transmitter.

The proposed dual sensor, single fill fluid volume differential pressure transmitter (1) is illustrated in FIG. 1 with the major components shown as a body (2), two process interface assemblies (3A) and (3B), high pressure process port (12), and low pressure process port (13).

Figure 2:
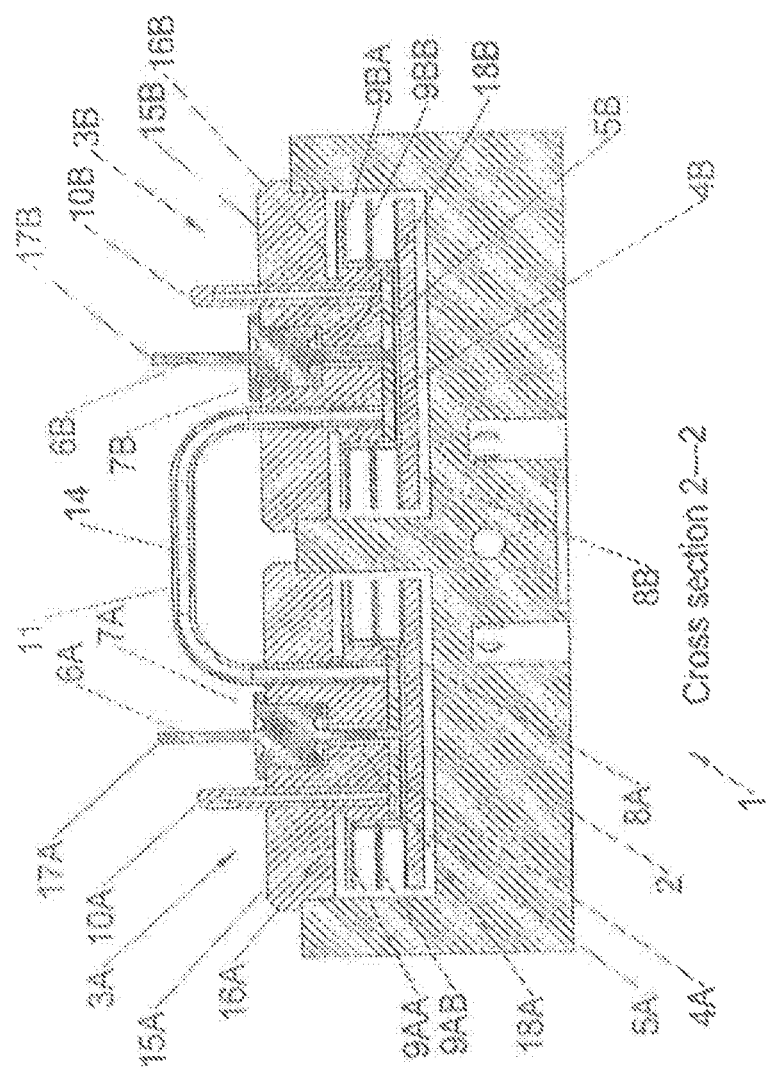
FIG. 2 is a cross sectional view of the proposed differential pressure sensor of the differential pressure transmitter.

The dual sensor, single fill fluid volume differential pressure transmitter (1) of FIG. 1 is very compact and optimized to accommodate present impulse line spacing of 2", 2⅛" and 2¼" between high-pressure process port (12) and low-pressure process port (13). The flexible element assembly (3A) of FIG. 2, is composed of a flexible element end (8A) and two convolutions (9AA) and (9AB). The flexible element assembly (3A) is attached to a base (15A) having an isolation groove (16A) that minimizes influences from distortion of the body (2) due to process pressure or process/environmental temperature. Additional components are the fill fluid (14), fill fluid connecting tube (11) and fill fluid filling ports (10A) and (10B).

The dual sensor measures the differential pressure by sensing the capacitance change due to the deflection of flexible element end (8A) with respect to the fixed electrode (4A) as shown in cross section 2-2 of FIG. 2. and simultaneously the deflection of flexible element end (8B) with respect to the fixed electrode (4B). The flexible element assemblies (3A) and (3B) thereby provide process isolation and a differential pressure sensing capability. The said fixed electrode and said flexible element end may be configured to provide improved shielding from undesired environmental electronic charges.

The flexible element assembly (3A) has an electrode (4A) mounted upon an insulator (5A) that is attached to the base (15A). The electrode (4A) has an electrical conductor (6A) providing electrical continuity from the electrode (4A) to an electrical termination (17A) of hermetic seal (7A). The electrical conductor (6A) has a stress relief (not shown) that minimizes thermal expansion and pressure expansion influences to assure reliable connectivity between electrode (4A) and the electrical termination (17A) of the hermetic seal (7A). Additionally, the electrical conductor (6A) is contained within an insulator (18A) to minimize undesirable capacitive coupling and restrict relative motion between the conductor (6A) and the body (2).

A fill fluid (14) hydraulically couples the flexible element assembly (3A) of the high side to the flexible element assembly (3B) of the low side. Thus, a high pressure applied to a flexible element assembly (3A) of the high side causes an inward deflection while the opposing flexible element assembly (3B) experiences an outward deflection.

Figure 3:
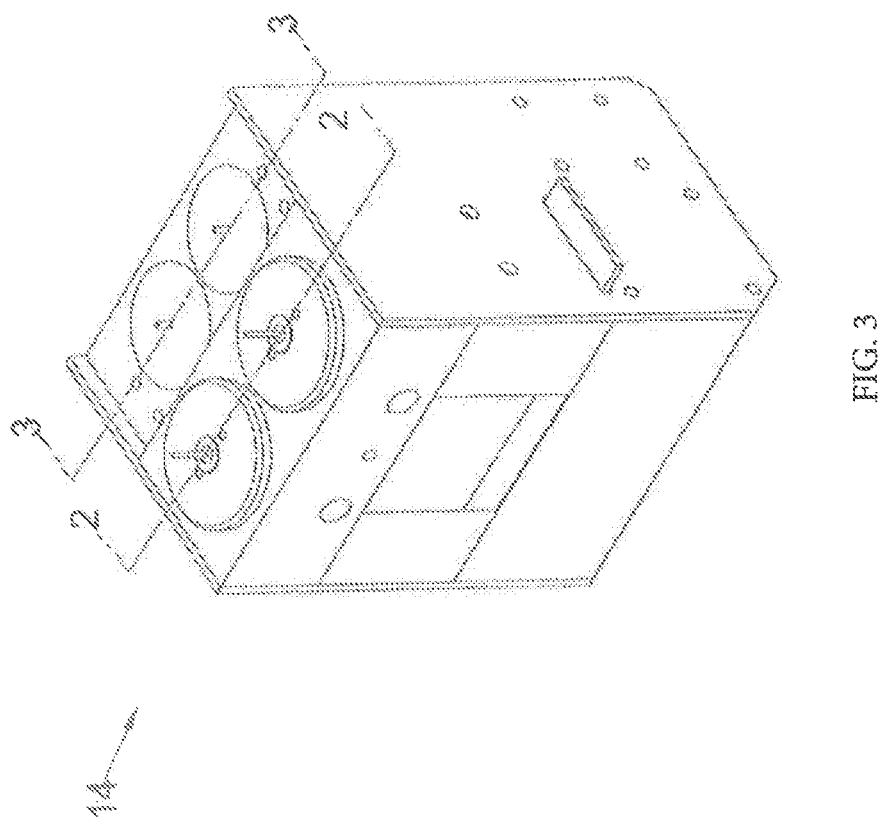
FIG. 3 is an isometric view of the premium differential pressure transmitter with integrated three-position valve and valve operator and gravitational reference with operator.

All ancillary devices are contained within an assembly (14) of FIG. 3. They will be described sequentially in the following description.

Figure 4:
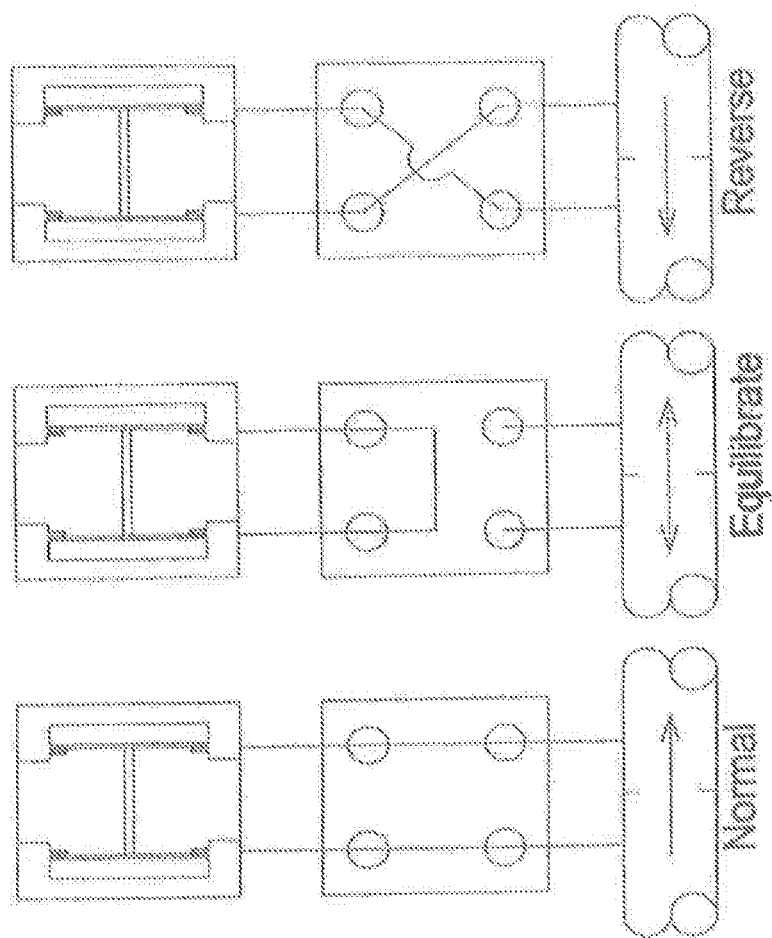
FIG. 4 is a schematic view illustrating the three position hydraulic connections.
Figure 5:
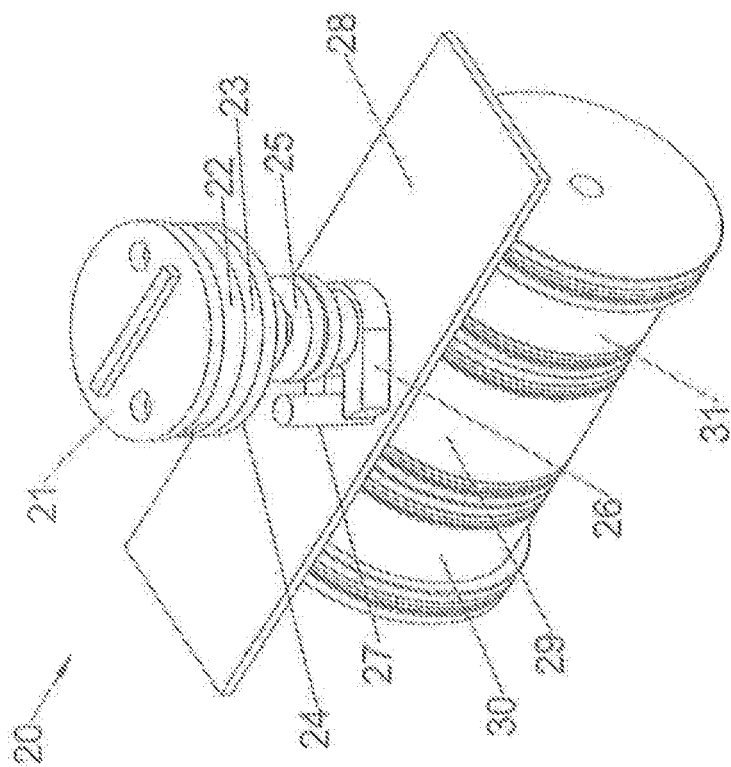
FIG. 5 is a view showing the three-position valve components in the normal position.

The three-position valve configures the proposed differential pressure transmitter (1) for normal, equilibrated or reverse operation and are shown schematically in FIG. 4. The main components of the proposed three-position valve and valve operator (20) are shown in FIG. 5 and now considered.

The normal position of FIG. 4. connects a high-pressure process port to a high-pressure differential pressure transmitter port and a low-pressure port to a high-pressure differential pressure transmitter with a normal flow direction.

Equilibrate position of FIG. 4. connects a high-pressure differential pressure transmitter port to a low-pressure differential pressure transmitter port equilibrating pressures and no differential pressure being applied to the differential pressure transmitter.

Reverse position of FIG. 4. connects a high-pressure process port to a high-pressure differential pressure transmitter port and a low-pressure process port to a low-pressure differential pressure transmitter port providing reverse flow measurement capability. Although the differential pressure transmitter (1) remains in the same position, the high-pressure and low-pressure ports of the reverse position of the differential pressure transmitter (1) are opposite the high-pressure and low-pressure ports of the normal position.

The three position valve and operator (20) as shown in FIG. 5 is composed of a fixed valve seat (21) that is restricted from rotation by a matching key way in the body (2) that is not shown and provides the ports for communication with the differential pressure transmitter (1), a selector disc (22) that is rotated to configure the desired positions of FIG. 4, a compensation plate that is not shown, provides axial compensation for thermal and pressure deflections and torsionally couples selector disc (22) to rotor (24), an axial spring (23) that provides a load to selector disc (22) and rotor (24) assuring that selector disc (22) achieves a seal with valve seat (21) while compensating for thermal and pressure deflections, rotor (24) is driven by a crank (26) of three position actuator.

Figure 6:
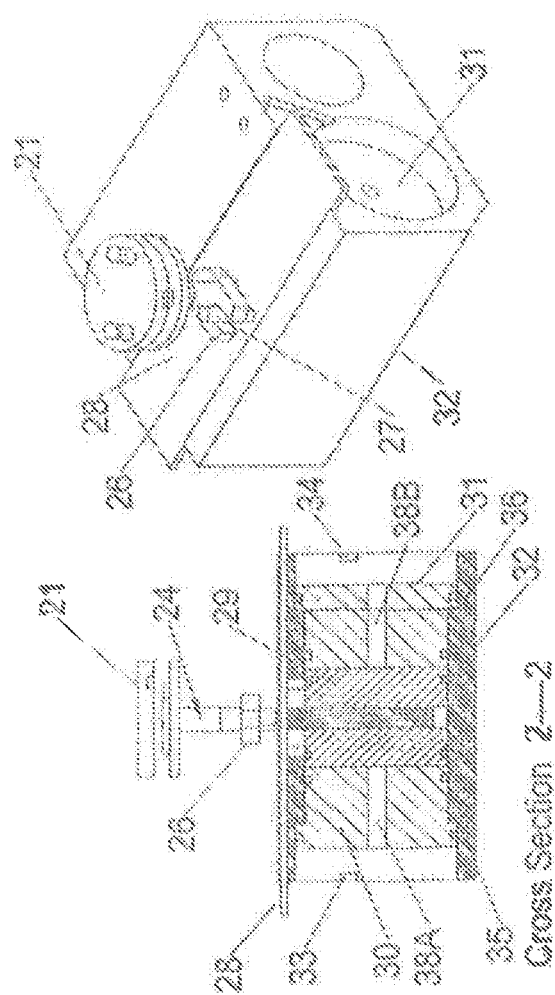
FIG. 6 is an isometric view of the three position valve components in the equilibrate position.

The novel three-position actuator of the three-position valve (20) is shown in cross section 2-2 of FIG. 6A for the equilibrate position. The center piston (29) is driven to the equilibrate position by applying pressure to port (33) that acts upon piston (30) forcing it to the right until arrested by stop (35) in cylinder of lower molding (32) and simultaneously applying pressure to port (34) that acts upon piston (31) forcing it to the left until arrested by stop (36) in the cylinder of lower molding (32).

The normal and reverse positions of the valve actuator are achieved by motion of three pistons (30), (31) and (32) having an innovative sequence. Referring to FIG. 6A, when the pneumatic port (33) on the left is pressurized, the left piston (30) travels to the right and engages the center piston (29) and sequentially engages the right piston (31) and continues to the right until piston (30) is limited by a stop (35) at this time the pressure is applied to center piston (29) through path (38A) and piston (31) is then driven to the right termination of the cylinder. Similarly, when the pneumatic port (34) on the right is pressurized, the right piston (31) travels to the left and engages the center piston (29) and sequentially engages the left piston (30) and continues to the left until piston (31) is limited by a stop (36) at this time the pressure is applied to center piston (29) through path (38B) and piston (30) is then driven to the left termination of the cylinder.

Motion of piston (29) of FIG. 6A actuates the valve. A post (37) of the center piston (29) is attached to valve plate (28) and valve plate (28) is coupled to a crank (26). As post (37) is positioned to the left, center and the right, it rotates the crank (30) of the three-position valve (20). The crank (26) turns the rotor (24) that positions the selector disk (22) to the desired valve position. The valve may also be operated manually by positioning valve plate (28) by hand. Valve plate (28) provides an indication of the position of the valve.

The three-position valve (20) provides the ability to determine and remove the influence of level or density in impulse lines. With a constant flow or ideally no flow, the three position valve (20) is first positioned in the normal position and the normal value of the differential pressure transmitter (1) is determined. Then the three-position valve (20) is positioned in the reverse position and the reverse value of the differential pressure transmitter (1) is determined. The results are compared, and a correction is made to minimize any level or density differences in the impulse lines.

Figure 7:
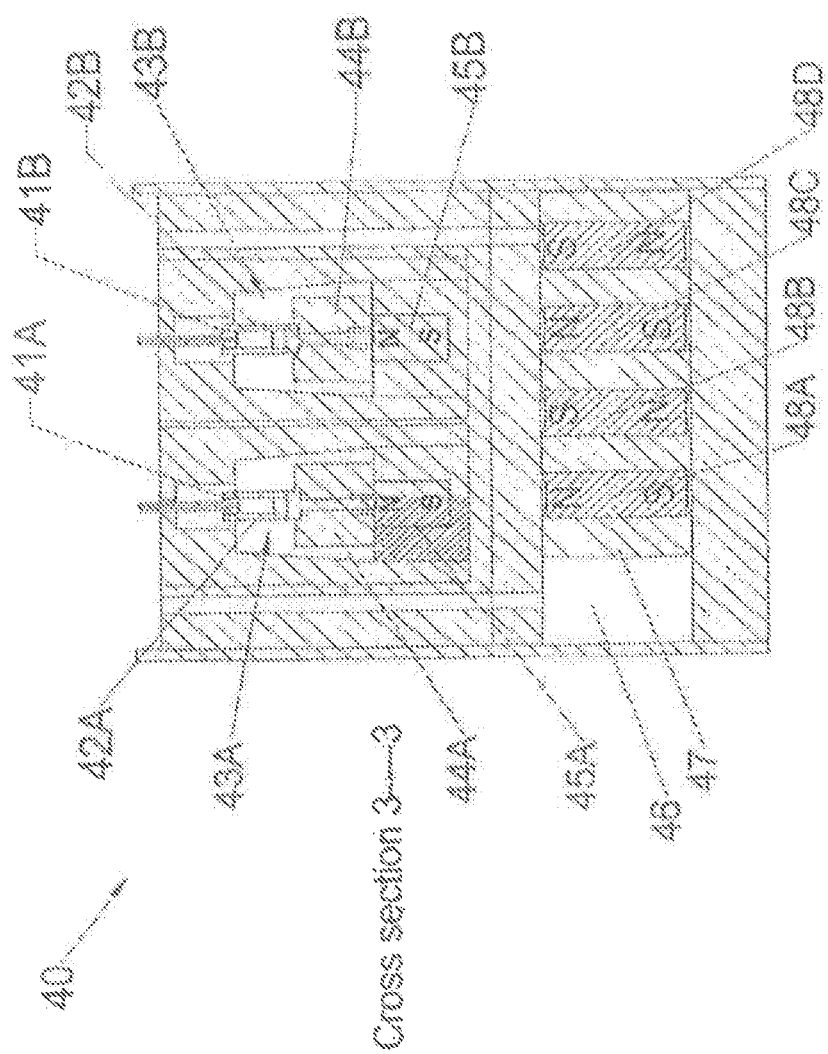
FIG. 7 is a cross sectional view of the gravitational pressure reference with the actuator in the normal run position.

The gravity pressure reference (40) shown in cross section 3-3 of FIG. 7, functions is described in detail in U.S. Pat. No. 6,321,585 Sgourakes for a Differential Pressure Generator. However, the basic operation is as follows:

The weight and cylinder assemblies (43A) and (43B) are raised with respect to fixed spherical pistons (41A) and (41B) and then allowed to descend under the action of gravity thereby producing a traceable, reliable reference pressure within the cylinders (42A) and (42B) that is applied to the differential pressure transmitter (1).

The principle of operation is simple. The weight and cylinder assembly (43A) on the high side has the same volume as the weight and cylinder assembly (43B) on the low side. The desired reference differential pressure is developed by a density difference of the weight and cylinder assembly (43A) with respect to the weight and cylinder assembly (43B). The density of the fill fluid changes significantly due to volume changes with respect to pressure or temperature. However, the fill fluid changes produce equal influences upon the assemblies and therefore do not influence the desired reference differential pressure. Thus, the reference differential pressure is not influenced by fill fluid density variations that occur with temperature or process pressure.

Innovative concepts have now been provided to enhance the raising and the descent of the weight and cylinder assemblies (43A) and (43B) of FIG. 7. Located within the enclosure are internal magnets (45A) and (45B) that are raised by an opposing magnet field or lowered by an attractive magnetic field. These magnetic fields are produced externally.

Positioning an external magnet (48) having an opposing magnetic orientation to the internal magnet (45) produces an opposing magnetic field that raises the internal magnet. Positioning an external magnet (48) having an attractive magnetic orientation to the internal magnet (45) produces an attractive magnetic field that lowers the internal magnet.

The positioning of the external magnets with respect to the internal magnets is simply done by shuttling the external magnets horizontally left or right a distance equal to the one half the horizontal distance between the internal magnets (45A) and (45B). This motion is illustrated in FIG. 7 illustrating the relationship in normal operation desiring to capture the internal magnets by providing an attractive field and reduce vibration of the internal magnets. Fewer magnets could be used but the desired advantage of capturing the internal magnets in normal operation thereby reducing pressure pulsations, would not be achieved.

Figure 8:
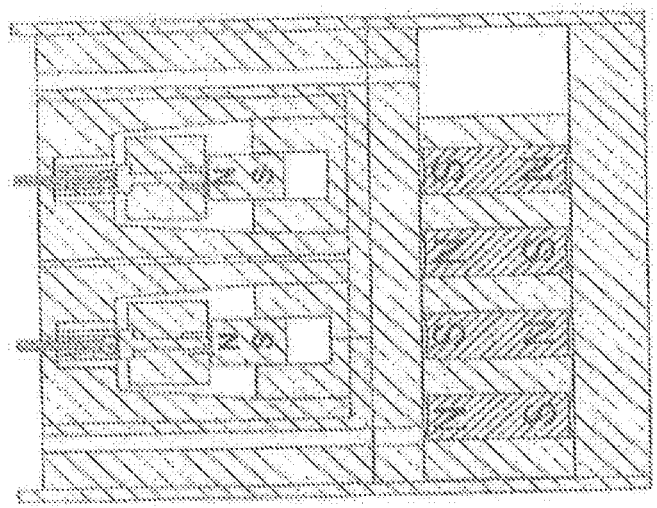
FIG. 8 is a cross sectional view of the gravitational pressure reference with the actuator having raised the weight and cylinder assembly and prepared to initiate development of the gravitational pressure reference.

In the moment prior to the descent of the weight and cylinder assemblies (43A) and (43B) the internal magnets are held in a position illustrated in FIG. 8. To initiate a descent the external magnets (48) are quickly returned to the normal position. At this time the weight assemblies (43A) and (43B) experience a gravitational force that is applied upon the effective area defined by the sphere within the cylinder thereby producing the desired differential pressure.

The positioning of the external magnets is achieved by pneumatic pressure applied to either end of the piston (47) carrying the external magnets (48).

A transmitter which may be a gauge pressure, absolute pressure or differential pressure transmitter is disclosed having an innovative compensation process assuring improved performance by eliminating undesired influences due to process temperature, process pressure, ambient temperature, over range, distortion of the sensor enclosure due to process pressure or bolting, changes in spring rates or effective areas of the dual sensors, while in the steady or the dynamic state.

In various embodiments of the innovative compensation process disclosed herein, one of the flexible element assemblies may be used as a reference.

The output of the transmitter is composed of a differential signal of the high-pressure sensor minus the low-pressure sensor. The compensation process considers that any common undesirable input of the same value and polarity is therefore self-cancelling, while desired signals of opposing polarity are additive and retained. However, it may not be realistic, due to manufacturing limitations, to consider that the gain of deflection due to pressure of the dual sensors being a function of the sensor spring rate and effective area are of the same value.

The innovative process disclosed herein overcomes this concern such that the gain is made to appear to be opposite in sign but equal and any existing zero offset is eliminated. The gain can then be adjusted to a standard value devoid of undesirable influences due to process temperature, process pressure, ambient temperature, over range, distortion of the sensor enclosure due to process pressure or bolting, changes in spring rates or effective areas of the dual sensors, while in the steady or the dynamic state.

The compensation of the dual sensors without the use of a common reference for each of the sensors is unduly complex and causes confusion. Embodiments disclosed herein address this difficulty by innovative means of achieving a common reference for comparison of the high-pressure sensor response to that of the low-pressure sensor. The high-pressure sensor is referred to as being the high side, and similarly the low-pressure sensor referred to as being the low side.

The volume displacement of the low side flexible element produces an identical volume displacement as the high side flexible element. Applying this fact, the applied pressure PH will now be developed as the desired common reference, then used to develop the equation for determining the differential pressure from deflections of the dual sensors, followed by the development of the compensation process:

Definitions

PH=applied pressure
PI=internal pressure of fill fluid
P=process pressure
$\Delta$VH=volume displaced by high side
$\Delta$VL=volume displaced by low side
AH=effective area high side
AL=effective area low side
KH=spring rate high side
KL=spring rate low side
DH=deflection of high side
DL=deflection of low side
DHP=deflection of high side due to PH
DLP=deflection of low side due to PH An applied differential pressure causes the high side flexible element to displace a volume of the fill fluid inward resulting in an identical volume displacement of the low side flexible element outward. This provides a sign convention that the displacement inward of the high side flexible element due to a positive applied differential pressure, is considered negative and the resulting displacement outward of the low side flexible element is considered positive. Thus, the volumes are equal in value and of opposite sign:

$$-\Delta VH = \Delta VL \quad \text{EQ 100}$$

$$-DH*AH = DL*AL \quad \text{EQ 101}$$

The high side deflection equation predicting its decrease is given by:

$$DH = (-PH - P + PI) * \frac{AH}{KH} \quad \text{EQ 102}$$

The low side deflection equation predicting its increase is given by:

$$DL = (PI - P) * \frac{AL}{KL} \quad \text{EQ 103}$$

Substituting DH and DL into $-DH*AH=DL*AL$ produces the following volume equality:

$$(-PH - P + PI) * \frac{AH^2}{KH} = (PI - P) * \frac{AL^2}{KL} \quad \text{EQ 104}$$

Solving for internal pressure PI, as a common function in terms of PH for the deflection of high and low sides provides the desired common reference:

$$PI = PH \frac{\frac{AH^2}{KH}}{\frac{AL^2}{KL} + \frac{AH^2}{KH}} + P \quad \text{EQ 105}$$

Next, equations to determine differential pressure are developed. Solving for the deflection of the high side in terms of the applied differential pressure PH finds that the process pressure P is not a factor and high side deflection is given by:

$$DHP = -PH \frac{AL^2}{KL} \frac{AH}{KH} \bigg/ \left( \frac{AH^2}{KH} + \frac{AL^2}{KL} \right) \quad \text{EQ 106}$$

Similarly, the deflection of the low side in terms of the applied pressure PH is given by:

$$DLP = PH \left( \frac{\frac{AH^2}{KH}}{\frac{AH^2}{KH} + \frac{AL^2}{KL}} \right) \frac{AL}{KL} \quad \text{EQ 107}$$

The total deflection in terms of the applied differential pressure PH, is given by:

$$DLP - DHP = PH \left( \frac{\frac{AH^2}{KH}}{\frac{AH^2}{KH} + \frac{AL^2}{KL}} \right) \frac{AL}{KL} + PH \left( \frac{\frac{AL^2}{KL}}{\frac{AH^2}{KH} + \frac{AL^2}{KL}} \right) \frac{AH}{KH} \quad \text{EQ 108}$$

Thus, the deflection due a differential pressure is determined with a common reference of PH which eases the analysis. When this total deflection of DLP-DHP is multiplied by a proportioning factor, it will provide an equation for the total differential pressure in desired units of measure.

Figure 9A:
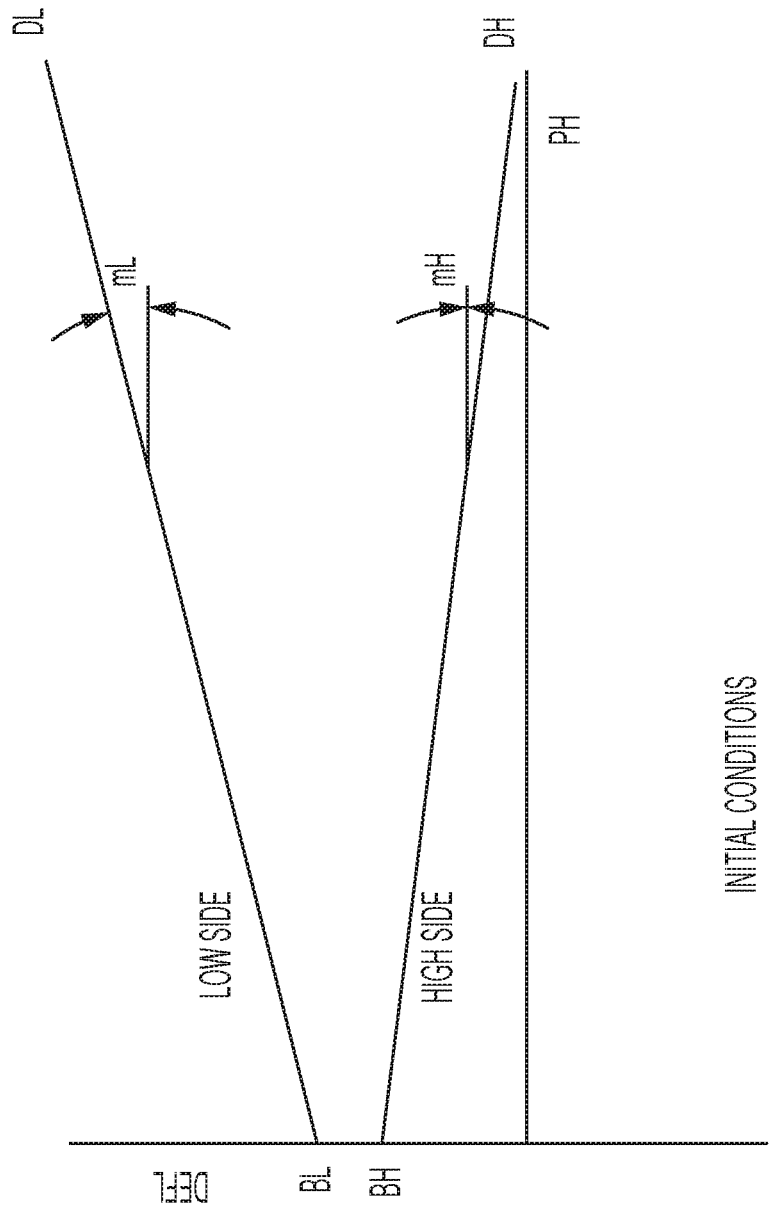
FIGS. 9A to 9C are charts illustrating a compensation process according to an embodiment, showing the initial conditions, slope equalization and offset elimination according to aspects of the present disclosure.
Figure 9B:
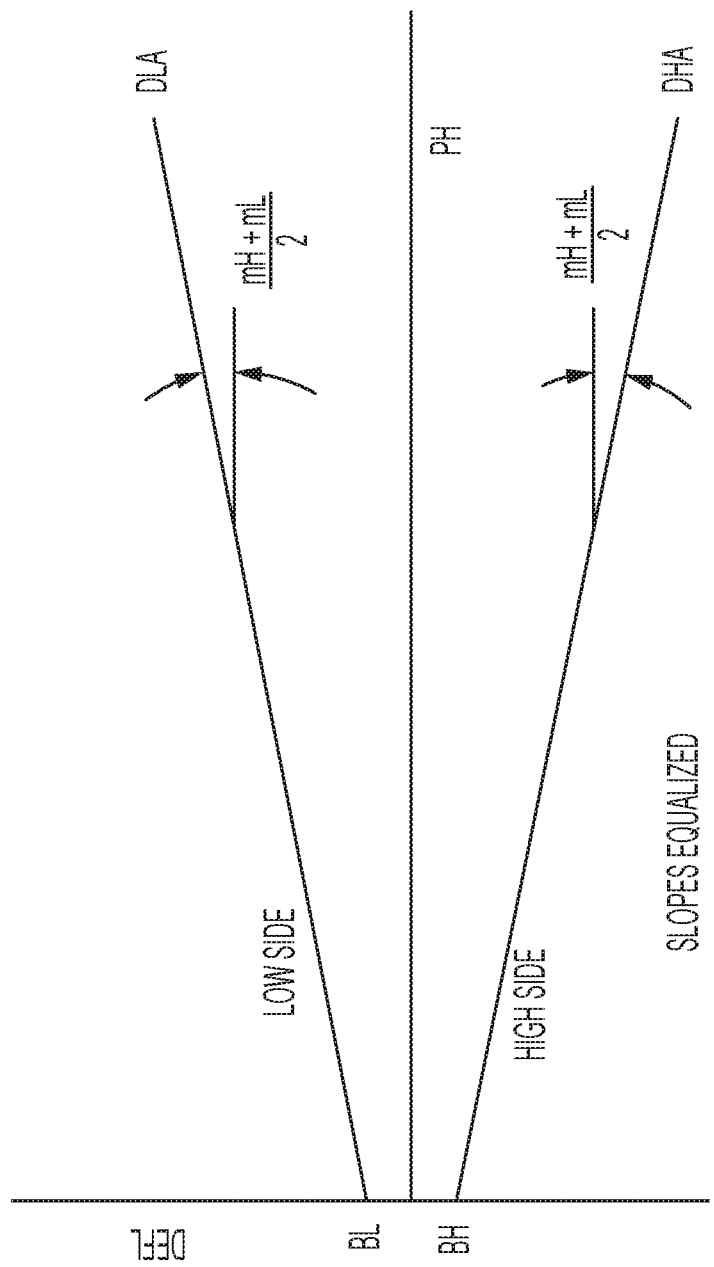
Figure 9C:
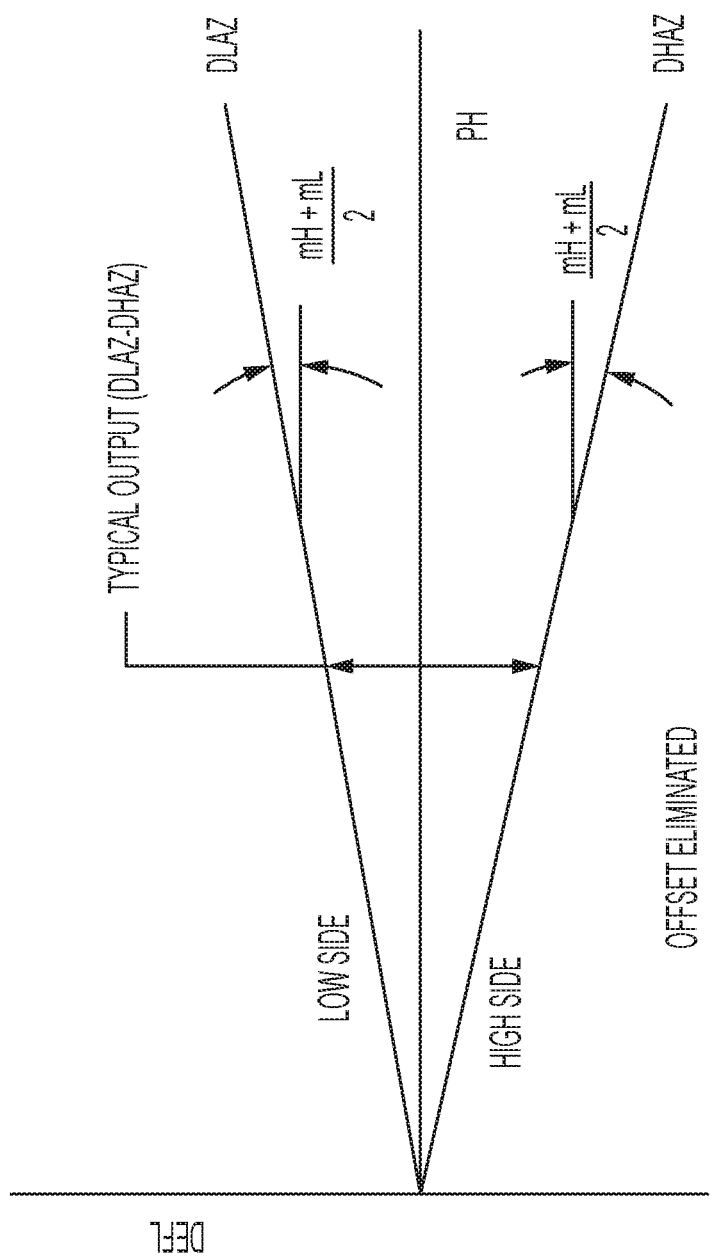

The high side and low side flexible element deflection responses can now be visualized with respect to PH as seen in FIGS. 9A-9C and described further below.

Additional Definitions

DHR=Position of high side flexible element end with PH
DHZ=Position of high side flexible element end without PH
DLR=Position of low side flexible element end with PH applied to high side
DLZ=Position of low side flexible element end without PH It will now be shown how the compensated equation inherently eliminates the detrimental influences of process and environmental influences.

A change in the common fill fluid pressure due to process and environmental influences will apply an equal pressure and related deflection upon each of the flexible element assemblies but will not cause any change in the differential pressure upon the flexible element assemblies. This is an important and basic benefit, for process temperature, process pressure, environmental temperature and enclosure distortion will change the common fill fluid volume but not the differential pressure being sensed. Therefore, the detrimental performance influences are inherently eliminated.

Equations describing the detrimental influences will now be provided. The deflection due to process pressure changing the compression of the fill fluid volume can be determined from the following equations:

$$DPH = \frac{-P*\beta*V}{\frac{AL^2}{KL}+\frac{AH^2}{KH}}\frac{AH}{KH} \qquad \text{EQ 109}$$

$$DPL = \frac{-P*\beta*V}{\frac{AL^2}{KL}+\frac{AH^2}{KH}}\frac{AL}{KL} \qquad \text{EQ 110}$$

Similarly, the deflection due to temperature of the fill fluid expanding or contracting the fill fluid volume can be determined from the following equations:

$$DTH = \frac{T*\alpha*V}{\frac{AL^2}{KL}+\frac{AH^2}{KH}}\frac{AH}{KH} \qquad \text{EQ 111}$$

$$DTL = \frac{T*\alpha*V}{\frac{AL^2}{KL}+\frac{AH^2}{KH}}\frac{AL}{KL} \qquad \text{EQ 112}$$

Including these influences within the basic equation provides:

$$DLPC + DHPC = \qquad \text{EQ 113}$$

$$\left[PH\frac{\frac{AH^2}{KH}}{\frac{AL^2}{KL}+\frac{AH^2}{KH}} + \frac{-P*\beta*V}{\frac{AL^2}{KL}+\frac{AH^2}{KH}} + \frac{T*\alpha*V}{\frac{AL^2}{KL}+\frac{AH^2}{KH}}\right]\frac{AL}{KL} +$$

$$\left[PH\frac{\frac{AL^2}{KL}}{\frac{AL^2}{KL}+\frac{AH^2}{KH}} - \frac{-P*\beta*V}{\frac{AL^2}{KL}+\frac{AH^2}{KH}} - \frac{T*\alpha*V}{\frac{AL^2}{KL}+\frac{AH^2}{KH}}\right]\frac{AH}{KH}$$

The distortion due to pressure or temperature of each housing produces deflections HsgH and HsgL upon the high side and the low side, respectively. Any distortion due to bolting produces deflections BCH and BCL on the high side and the low side, respectively. The reference sensor position associated with zero condition determined by manufacturing variations or changes with time is identified as CH and CL for the high side and the low side, respectively.

The complete equation is now presented with all undesireable influences of significance prior to compensation:

$$DLPC + \qquad \text{EQ 114}$$

$$DHPC = \left[PH\frac{\frac{AH^2}{KH}}{\frac{AL^2}{KL}+\frac{AH^2}{KH}} + \frac{-P*\beta*V}{\frac{AL^2}{KL}+\frac{AH^2}{KH}} + \frac{T*\alpha*V}{\frac{AL^2}{KL}+\frac{AH^2}{KH}}\right]$$

$$\frac{AL}{KL} + HsgL + BCL +$$

-continued $$CL + \left[PH\frac{\frac{AL^2}{KL}}{\frac{AL^2}{KL}+\frac{AH^2}{KH}} - \frac{-P*\beta*V}{\frac{AL^2}{KL}+\frac{AH^2}{KH}} - \frac{T*\alpha*V}{\frac{AL^2}{KL}+\frac{AH^2}{KH}}\right]$$

$$\frac{AH}{KH} - HsgH - BCH - CH$$

Following compensation, all influences are eliminated and the output is doubled:

$$DLPC + DHPC = PH\left\{\frac{\frac{AH^2}{KH}}{\frac{AL^2}{KL}+\frac{AH^2}{KH}}\frac{AL}{KL} + \frac{\frac{AL^2}{KL}}{\frac{AL^2}{KL}+\frac{AH^2}{KH}}\frac{AH}{KH}\right\} \qquad \text{EQ 115}$$

In one embodiment, an innovative seven step compensation process achieves the desired results of eliminating all influences while doubling the output. In one embodiment, the compensation process may include seven steps, comprising:

1A. Acquire DH output of high side in response to PH and all influences at operating point.

1B. Acquire DL output of low side in response to PH and all influences at same operating point. FIG. 9A is a chart showing the low side deflection signal DL and the high side deflection signal DH as a function of the applied pressure PH. As shown in the initial conditions chart of FIG. 9A, DL and DH have different slopes. Further, the deflection signals have non-zero offsets; DL has an offset of BL, and DH has an offset of BH.

2. Compute the average of DH and DL as acquired with DA=(DH+DL)/2.

3A. Subtract DA from the value of DH just acquired, thus producing a value of DHA.

3B. Subtract DA from the value of DL just acquired, thus producing a value of DLA. FIG. 9B shows a chart of the normalized deflection signals DLA and DHA for the low side and the high side, respectively. The normalization step equalizes the slopes, as shown in FIG. 9B. That is, DHA and associated DLA will now have equal but opposite polarity gain. Further, the values of deflection for various influences at PH=0 are all summed in BL for low sensor and BH in high sensor as shown in FIG.9A. 9B and 9C.

4A. Obtain by regression analysis of available DHA data or by other means, their zero-point value and subtract this zero-point value from present DHA producing DHAZ at present operating point. Thus, a linear relationship is produced, containing all the values of DHAZ passing through zero-value without an offset and defined by DHAZ=mH*PH, wherein mH possesses the negative gain of linear relation of DHAZ versus PH, from regression analysis of all updated available data or by other means.

4B. Obtain by regression analysis of available DLA data or by other means, their zero-point value and subtract this zero-point value from present DLA producing DLAZ at present operating point. Thus, a linear relationship is produced containing all the values of DLAZ passing through zero-value without an offset and defined by DLAZ=mL*PH, wherein mL possesses the gain of linear relation of DLAZ versus PH, from regression analysis of all updated available data or by other means. FIG. 9C shows a chart of the offset-corrected normalized deflection signals DLAZ and DHAZ for the low side and the high side, respectively. As shown in the chart, the slopes are of equal value and opposite sign, and the offsets are eliminated. The output is now available as a function of deflection that is proportional to PH having an equation DLAZ−DHAZ without a zero offset and not influenced by any undesirable influences such as process temperature, ambient temperature, process pressure, over range, distortion of the sensor enclosure and distortion due to bolting. However, it is susceptible to sensor change influences which will be removed by Step 5.

5A. Calculate a proportioned value DHAZP=Stroke*DHAZ/DHAZPFS wherein "Stroke" equals a standardized deflection at full span that theory and/or typical response would anticipate. DHAZ is that realized from Step 4A and DHAZPFS is the full span value continuously computed by regression analysis of all acquired results of 4A or by other means.

5B. Calculate a proportioned value DLAZP=Stroke*DLAZ/DLAZPFS wherein "Stroke" equals a standardized deflection at full span that theory and/or typical response would anticipate. DLAZ is that realized from Step 4B and DLAZPFS is the full span value continuously computed by regression analysis of all acquired results of 4B or by other means.

6. Calculate the Output=DLAZP−DHAZP in inches of deflection, which is now continuously compensated to eliminate undesired sensor influences of spring rate and effective area as they might occur.

7. This Output can now be multiplied by an appropriate factor, to obtain desired units of measure.

At every acquisition of the output, there is now available the present actual zero-point value of each acquisition.

In another embodiment, an alternative compensation process is provided, comprising:

1. Acquire DH output of high side sensor in response to PH and all influences.

2. Subtract the zero-point value of the high side sensor from the value of DH just acquired, thus producing a value of DHZ.

3. Acquire DL output of low side sensor in response to PH and all influences.

4. Subtract the zero-point value of the low side sensor from the value of DL just acquired, thus producing a value of DLZ.

5. From the values of DHZ determine the negative gain from the full span value minus the zero-point value divided by the full span value of PH.

6. From the values of DLZ determine the gain from the full span value minus the zero-point value divided by the full span value of PH.

7. Compensate the gain of the low side by multiplying all values by the ratio of the low side gain divided by the high side gain producing a value of DHZG.

8. The values of low side and high side compensated for zero-point and gain, can now be processed as shown in initial compensation process to provide output in desired units of measure.

Figure 10:
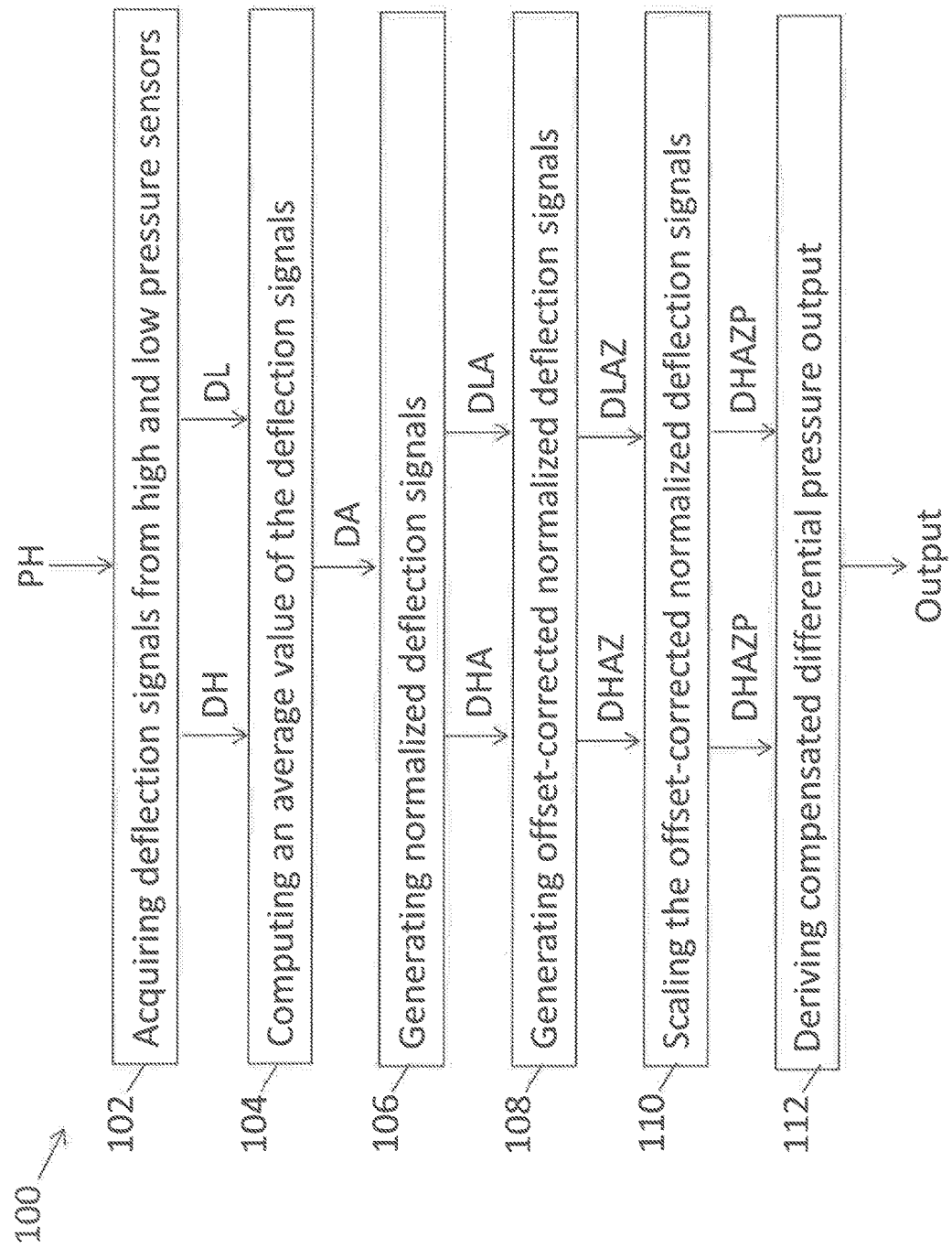
FIG. 10 is a schematic diagram illustrating one embodiment of a method of compensating for undesired influences in a pressure transmitter according to aspects of the present disclosure.

FIG. 10 is a schematic diagram illustrating one embodiment of a method 100 of compensating for undesired influences in a pressure transmitter according to aspects of the present disclosure. The method 100 comprises acquiring deflection signals from high and low pressure sensors, as shown at 102. The deflection signals DH and DL are acquired in response to an applied pressure PH, as well as other influences (e.g., DT, DP, HsgH, HsgL, CH, CL, BCH and BCL as discussed above). The method 100 further comprises computing an average value of the deflection signals DH and DL, as shown at 104. The resulting signal is DA=(DH+DL)/2. The method 100 further comprises generating normalized deflection signals as shown at 106, so as to equalize the slopes as was shown and discussed in relation to FIG. 9B. Generating the normalized deflection signals may include subtracting the average value DA of the deflection signals from each of the deflection signals DH and DL. The normalized deflection signal for the high side is computed as DHA=DH−DA, and the normalized deflection signal for the low side is computed as DLA=DL−DA.

The method 100 further comprises generating offset-corrected normalized deflection signals as shown at 108, so as to eliminate the offsets as shown and discussed in relation to FIG. 9C. Generating offset-corrected normalized deflection signals may comprise subtracting zero-point offsets from the normalized deflection signals. For example, an offset-corrected normalized deflection signal for the high side may be computed as DHAZ=DHA−BHA, as discussed above. Similarly, an offset-corrected normalized deflection signal for the low side may be computed as DLAZ=DLA−BLA. The zero offset values BLA and BHA may be obtained, for example, from an initial calibration. In other embodiments, the zero offset values may be obtained based on regression analysis of previously obtained signals from each of the high and low pressure sensors.

The method 100 further comprises scaling the offset-corrected normalized deflection signals as shown at 110. Scaling the offset-corrected normalized deflection signals may comprise multiplying the offset-corrected normalized deflection signals by compensation scaling factors. For example, the scaled offset-corrected normalized deflection signal DHAZP for the high side may be obtained by multiplying DHAZ by a first compensation scaling factor. The scaled offset-corrected normalized deflection signal DLAZP for the low side may be obtained by multiplying DLAZ by a second compensation scaling factor. In one embodiment, the first compensation scaling factor may be proportional to a predefined standard deflection associated with the high-pressure sensor, and may be inversely proportional to a full span deflection associated with the high pressure sensor obtained via regression analysis of previously obtained signals from the high-pressure sensor. In one embodiment, the second compensation scaling factor may be proportional to a predefined standard deflection associated with the low-pressure sensor and may be inversely proportional to a full span deflection associated with the low-pressure sensor obtained via regression analysis of previously obtained signals from the low-pressure sensor.

The method 100 further comprises deriving a compensated differential pressure output as shown at 112. The output may be obtained by subtracting the high side scaled offset-corrected normalized deflection signal from the low side scaled offset-corrected normalized deflection signal, that is Output=DLAZP−DHAZP.

In some embodiments, the method 100 may comprise additional steps. For example, the method 100 may further comprise obtaining the differential pressure in a desired unit, for example by multiplying the compensated differential pressure by a conversion factor.

In various embodiments disclosed herein, the deflections DHP and DLP, produced by application of PH, are sensed by their respective flexible element capacitive deflection sensing means. However, it is recognized that other types of sensors for sensing the deflection could be considered by those skilled in the art.

Various embodiments disclosed herein assure that any pressure due to undesirable influences is applied equally to the high side as well as the low side sensors by means of a construction having a common fill fluid. It is assured that the undesirable influences acting in a common mode are equally applied to both sensors.

The desired applied pressure is determined by obtaining the difference between the low side and the high side sensors. However, the high side sensor has a portion of the desired applied pressure in addition to the pressure of the undesirable influences. The low side sensor also has a portion of the desired applied pressure in addition to the pressure of the undesirable influences. The differential sensing of the low side and high side sensors thereby eliminates any contribution of the undesirable influences from influencing the desired applied pressure, only if the gain of the low side and high side sensors are of equal value and opposite sign.

The present disclosure recognizes that the gain of the low side and high side sensors cannot be assured of being identical due to manufacturing limitations. However, this issue is resolved with an innovative concept for compensating the absolute gain of the low side sensor to equal that of the high side sensor.

The deflections DH being acquired are composed of the desired pressure inputs DHP and undesired influences from process temperature DTH, ambient temperature DTA, process pressure DTPH, over range ORH, distortion of the sensor enclosure HsgH, changes due to bolting BCH and changes in spring rates or effective areas of the high side DKAH, while in the steady or the dynamic state.

The deflections DL being acquired are composed of the desired pressure inputs DLP and undesired influences from process temperature DTL, ambient temperature DTA, process pressure DTPL, over range ORL, distortion of the sensor enclosure HsgL, changes due to bolting BCL and changes in spring rates or effective areas of the low-side DKAL, while in the steady or the dynamic state.

The compensation is initiated by deflections DH and DL being averaged to produce a common value DA at each position sensed. This value DA is subtracted from each of the sensed deflections of DH and DL for all values within the span producing a linear relationship in DHA and DLA having equal gain of opposite polarity and equal values at zero value which may be offset.

At this stage of the compensation, both plots are a mirror image of equal absolute value about the PH axis having a positive gain for the low side and a negative gain for the high side, as shown and discussed in relation with FIG. 9B. Although the greater portion of common mode undesirable influences of low side or high side have now been rejected, there can be a residual influence due to gain differences prior to achieving equal slopes with opposite polarity. So, prior to finalizing the output, these undesirable minimum residual values of DH such as DHP, DTH, DPH, HsgH, BCH and CH are removed from the values of DHA as well as DLP, DTL, DPL, HsgL, BCL and CL are removed from values of DLA.

These minimal offsets or "zero-shifts" are easily removed by subtracting any residual "zero shift values" that might exist in any of the values of DHA and DLA, as determined by regression analysis or other means, thus producing the plots of DHAZ and DLAZ with equal value but opposing polarity and having no zero-offset value, as shown and discussed in relation with FIG. 9C.

Additionally, an innovative means of eliminating the difference in response of the dual sensors induces a constant full span value of deflection "Stroke" of the output, and the values of DHAZ and DLAZ are scaled to produce a proportional output of DHAZP and DLAZP. This scaling is achieved by proportioning each value of DLAZ by a term defined by the specific value of deflection multiplied by "Stroke", divided by the full span value of DLAZFS. Similarly, scaling is achieved by proportioning each value of DHAZ by a term defined by the specific value of deflection multiplied by "Stroke", divided by the full span value of DHAZFS. This proportioning provides a consistent full span value of the "Output" that eliminates calibration changes due to effective area and changes of spring rate of the sensor in an ongoing manner into the future.

The single fill fluid dual sensor concept assures influences of DTL, DTH, DPL, DPH are equally applied to each of the flexible element assemblies. When combined with the disclosed compensation concept of the flexible element assemblies, there is an assurance of the compensation in an on-going manner of all undesirable performance influences from process or ambient temperature, or process pressure (DH, DPH, DTL and DPL) while in the steady or the dynamic state, as well as changes in calibration due to changes in the effective areas or changes in spring rates of the non-reference sensor, influences of housing distortion HsgH, BCH, BCL and HsgL and the reference positions of sensors CH and CL.

Figure 11:
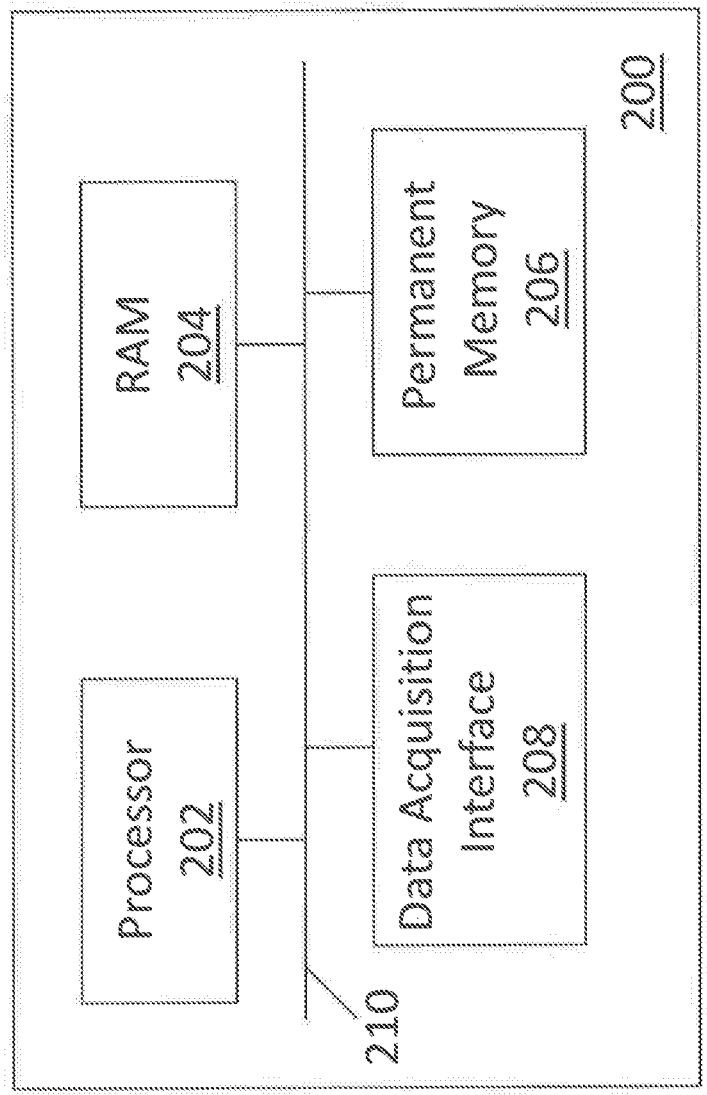
FIG. 11 is an example illustration of digital electronic circuitry or computer hardware that can be used with the embodiments disclosed herein.
Figure 9A:
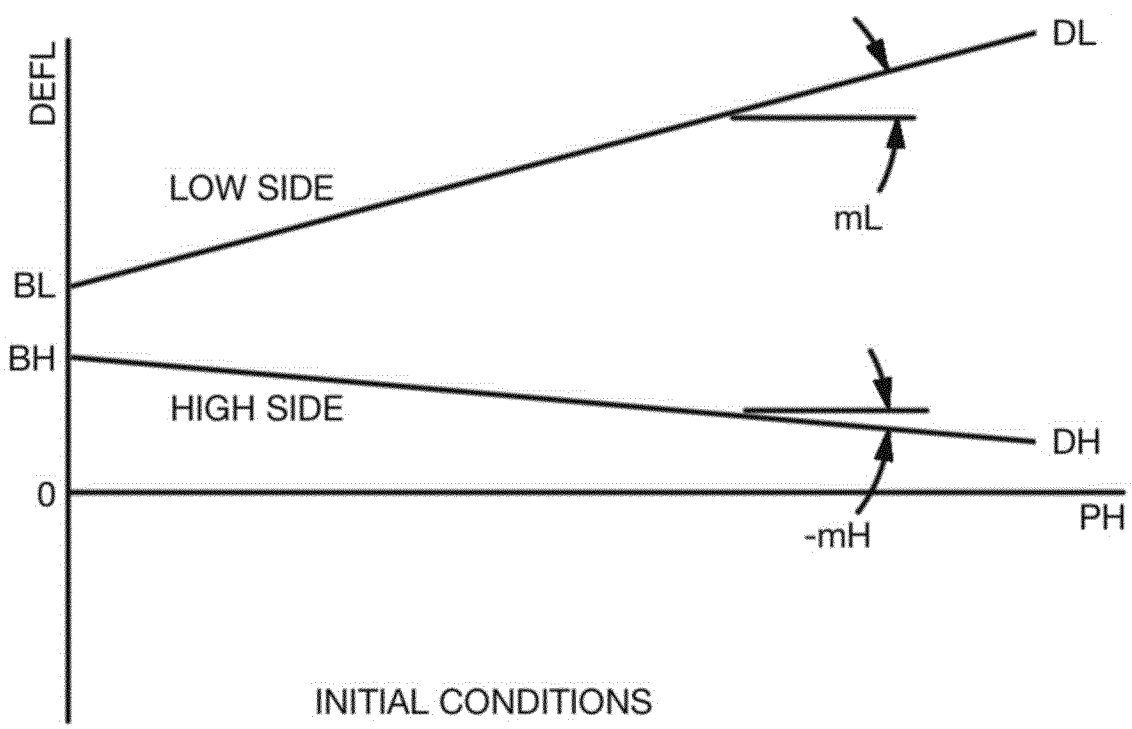
Figure 9B:
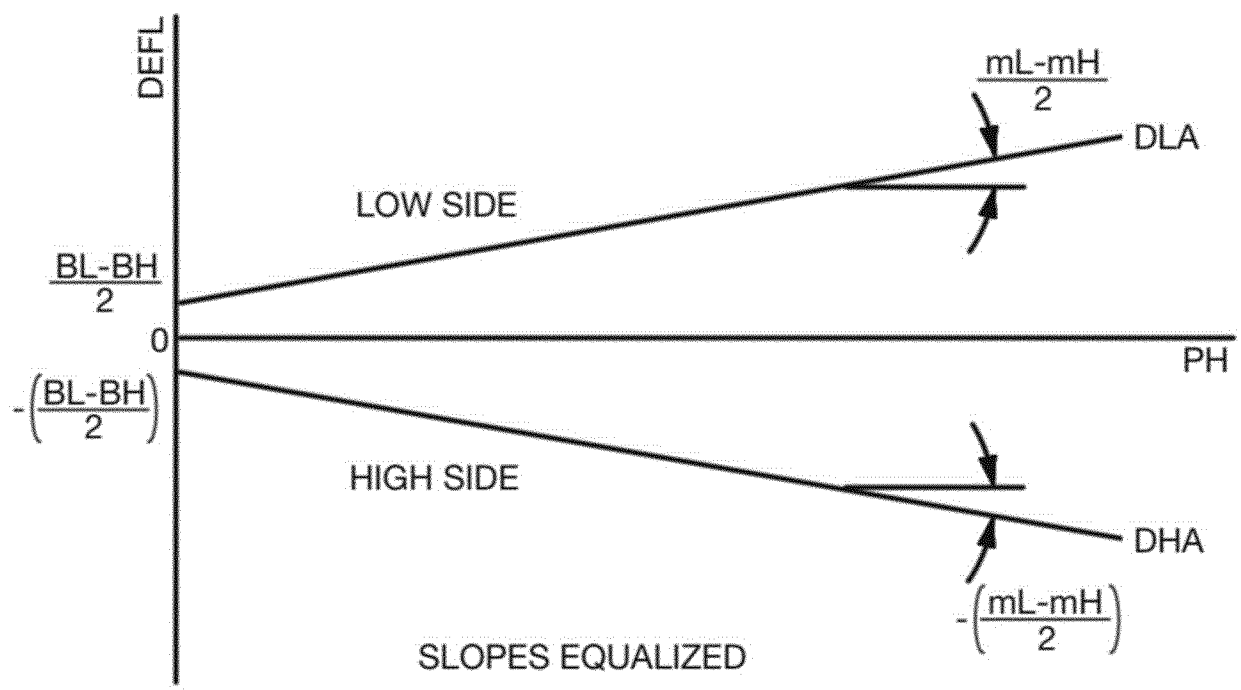
Figure 9C:
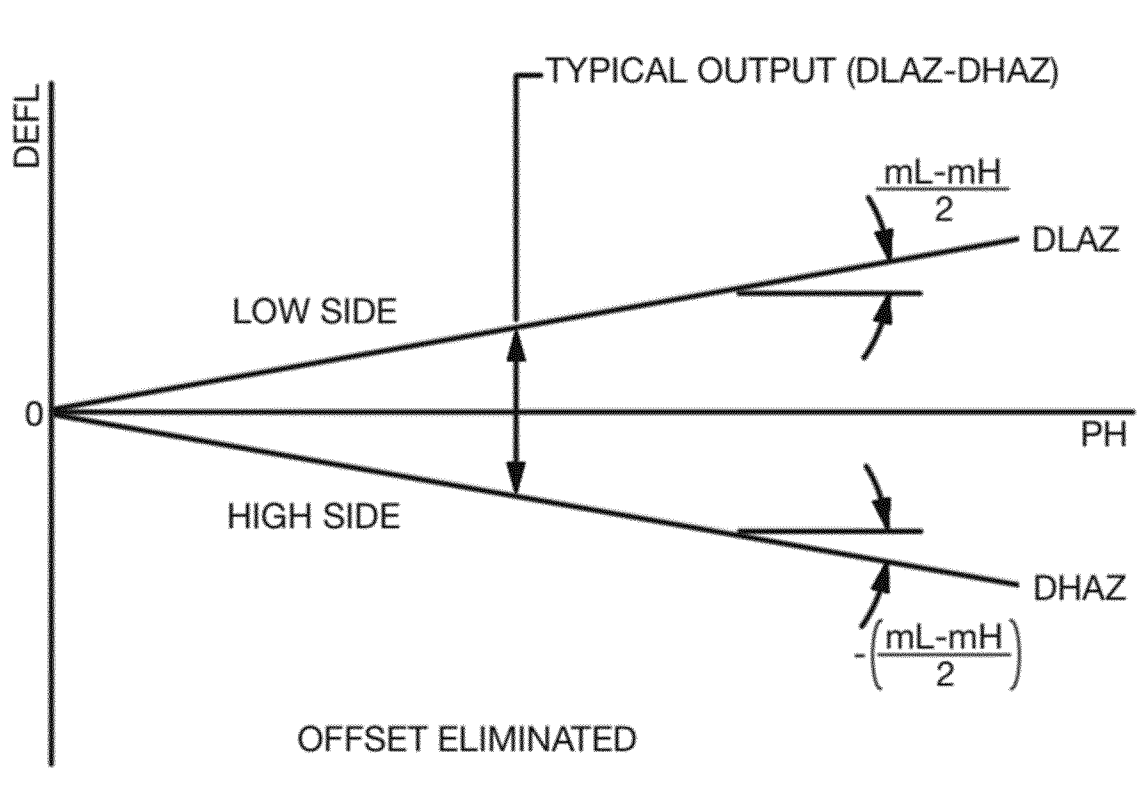

In some embodiments, the above methods for compensating for undesirable influences in a passive transmitter can be implemented on a computer. By way of example, FIG. 11 schematically depicts an example of a computing device 200 that can be employed to implement compensation methods according to the present teachings. The computing device 200 includes a processor 202, at least one random access memory (RAM) module 204, a permanent memory 206, and a data acquisition interface 208 for receiving data from a differential transmitter, e.g., deflection data associated with the flexible assemblies. A bus 210 allows communication between the processor and various components of the computing device. In some embodiments, instructions for implementing compensation methods according to the present teachings can be stored in the permanent memory, and can be loaded into the RAM module for operating on the data received from a differential sensor in accordance with the present teachings.

The processor 202 can be any suitable processor available in the art. The processor 202 can be configured to carry out various functions described herein. These functions can be carried out and implemented by any suitable computer system and/or in digital circuitry or computer hardware. The processor 202 can implement and/or control the various functions and methods described herein. The processor 202 can be connected to a permanent memory 206. The processor 202 and the permanent memory 206 can be included in or supplemented by special purpose logic circuitry.

The processor 202 can include a central processing unit (CPU, not shown) that includes processing circuitry configured to manipulate and execute various instructions. For example, the processor 202 can be a general and/or special purpose microprocessor and any one or more processors of any kind of digital computer. Generally, the processor 202 can be configured to receive instructions and data from a memory module (e.g., a read-only memory or a random access memory or both) and execute the instructions. The instructions and other data can be stored in the memory.

The permanent memory 206 can be any form of non-volatile memory included in machine-readable storage devices suitable for embodying data and computer program instructions. For example, the permanent memory 206 can be a magnetic disk (e.g., internal or removable disks), magneto-optical disk, one or more of a semiconductor memory device (e.g., EPROM or EEPROM), flash memory, CD-ROM, and/or DVD-ROM disks.

Various embodiments disclosed herein can be implemented in digital electronic circuitry or in computer hardware that executes software, firmware, or combinations thereof. The implementation can be as a computer program product, for example a computer program tangibly embodied in a non-transitory machine-readable storage device, for execution by, or to control the operation of, data processing apparatus, for example a computer, a programmable processor, or multiple computers. In some embodiments, transmission and reception of data, information, and instructions can occur over the communications network.

Accordingly, embodiments disclosed herein provide a higher level of performance that does not exist in pressure transmitters.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. It is also to be understood that the terminology used herein, is for the purpose of describing particular embodiments only, and not intended to be limiting.

What is claimed is:

1. A method of compensating for undesired influences in a pressure transmitter wherein the pressure transmitter comprises a body for housing a low-pressure sensor and a high-pressure sensor each of which is in fluid communication with a port and in further fluid communication with each other through a connector tube containing a fill fluid, said method comprising:
acquiring a first deflection signal from the high-pressure sensor in response to an applied pressure,
acquiring a second deflection signal from the low-pressure sensor in response to an applied pressure,
computing an average value of said first and second deflection signals,
subtracting said average value from said first and said second deflection signals to generate normalized first deflection signal and normalized second deflection signal, respectively,
subtracting a high-pressure zero-point offset from said normalized first deflection signal to generate offset-corrected normalized first deflection signal,
subtracting a low-pressure zero-point offset from said normalized second deflection signal to generate offset-corrected normalized second deflection signal,
multiplying said offset-corrected normalized first deflection signal by a first compensation scaling factor to obtain scaled offset-corrected normalized first deflection signal,
multiplying said offset-corrected normalized second deflection signal by a second compensation scaling factor to obtain scaled offset-corrected normalized second deflection signal, and
subtracting said first scaled offset-corrected normalized first deflection signal from said second scaled offset-corrected normalized second deflection signal to derive a compensated differential pressure.

2. The method of claim 1, further comprising multiplying said compensated differential pressure by a conversion factor to obtain said differential pressure in desired units of measure.

3. The method of claim 1, wherein any of said high-pressure and low-pressure zero offset is determined via regression analysis of previously obtained signals from said high pressure sensor and said low-pressure sensor, respectively, in response to applied pressures.

4. The method of claim 1, wherein any of said high-pressure and low-pressure zero offset is determined from an initial calibration.

5. The method of claim 1, wherein said first compensation scaling factor is proportional to a predefined standard deflection associated with said high-pressure sensor and is inversely proportional to a full span deflection associated with said high pressure sensor obtained via regression analysis of previously obtained signals from said high-pressure sensor.

6. The method of claim 1, wherein said second compensation scaling factor is proportional to a predefined standard deflection associated with said low-pressure sensor and is inversely proportional to a full span deflection associated with said low-pressure sensor obtained via regression analysis of previously obtained signals from said low-pressure sensor.

7. The method of claim 1, further comprising providing a common reference for a differential pressure sustained by each of the said low-pressure sensor and high-pressure sensor based upon an equation predicting an internal pressure upon said low-pressure sensor and high-pressure sensor, said internal pressure being a parameter within the equation for the differential pressure sustained by each of the said low-pressure sensor and high-pressure sensor providing said common reference.

8. The method of claim 1, wherein said steps are performed by a processor.

9. The method of claim 1, further comprising sensing a compression of said fill fluid by any of said high-pressure or low-pressure zero offset to provide a measure of process pressure after compensating any influence of temperature on said fill fluid.

10. The method of claim 1, further comprising providing a differential pressure sustained by each of said dual sensors by employing a relation predicting the internal pressure upon said dual sensors.

11. A method of compensating for undesired influences in a pressure transmitter wherein the pressure transmitter comprises a low-pressure sensor and a high-pressure sensor in further fluid communication with each other through a connector tube containing a fill fluid, said method comprising:
acquiring deflection signals from the high-pressure sensor and the low-pressure sensor,
computing an average value of the deflection signals,
generating normalized deflection signals based on the average value,
generating offset-corrected normalized deflection signals,
scaling said offset-corrected normalized deflection signals, and
deriving a compensated differential pressure output based on the scaled offset-corrected normalized deflection signals.

12. The method of claim 11, further comprising converting said compensated differential pressure output to a desired unit of measure.

13. The method of claim 11, wherein generating said normalized deflection signals comprises equalizing the absolute value of the gains of the high-pressure sensor and the low-pressure sensor.

14. The method of claim 11, wherein generating offset-corrected normalized deflection signals further comprises determining zero offsets for the high-pressure sensor and the low-pressure sensor.

15. The method of claim 14, wherein determining zero offsets comprises performing regression analysis of previously obtained signals from the high-pressure sensor and the low-pressure sensor.

16. The method of claim 11, wherein scaling said offset-corrected normalized deflection signals comprises multiplying said offset-corrected normalized deflection signals for each of the high-pressure sensor and the low-pressure sensor by respective compensation scaling factors.

17. The method of claim 16, wherein the compensation scaling factor for the high-pressure sensor is proportional to a predefined standard deflection associated with said high-pressure sensor and is inversely proportional to a full span deflection associated with said high pressure sensor obtained via regression analysis of previously obtained signals from said high-pressure sensor.

18. The method of claim 16, wherein the compensation scaling factor for the low-pressure sensor is proportional to a predefined standard deflection associated with said low-pressure sensor and is inversely proportional to a full span deflection associated with said low-pressure sensor obtained via regression analysis of previously obtained signals from said low-pressure sensor.

* * * * *

UNITED STATES PATENT AND TRADEMARK OFFICE
CERTIFICATE OF CORRECTION

| | | |
|---|---|---|
| PATENT NO. | : 10,466,127 B2 | Page 1 of 4 |
| APPLICATION NO. | : 16/152969 | |
| DATED | : November 5, 2019 | |
| INVENTOR(S) | : George E. Sgourakes | |

It is certified that error appears in the above-identified patent and that said Letters Patent is hereby corrected as shown below:

Drawing sheets 9/13 through 11/13, containing FIGS. 9A-9C, should be replaced with the Replacement Sheets.

Signed and Sealed this
Sixth Day of July, 2021

Drew Hirshfeld
*Performing the Functions and Duties of the
Under Secretary of Commerce for Intellectual Property and
Director of the United States Patent and Trademark Office*